(12) United States Patent
Hu

(10) Patent No.: US 10,564,785 B2
(45) Date of Patent: Feb. 18, 2020

(54) DEVICE AND METHOD FOR SENSING BIOLOGICAL FEATURE

(71) Applicant: Touchplus Information Corp., New Taipei (TW)

(72) Inventor: Shih-Hsien Hu, New Taipei (TW)

(73) Assignee: TOUCHPLUS INFORMATION CORP., New Taipei (TW)

(*) Notice: Subject to any disclaimer, the term of this patent is extended or adjusted under 35 U.S.C. 154(b) by 98 days.

(21) Appl. No.: 15/974,751

(22) Filed: May 9, 2018

(65) Prior Publication Data
US 2018/0329538 A1    Nov. 15, 2018

(30) Foreign Application Priority Data

May 9, 2017    (TW) .............................. 106115384 A

(51) Int. Cl.
*G06F 3/044*    (2006.01)
*G06F 3/041*    (2006.01)
*G06K 9/00*    (2006.01)

(52) U.S. Cl.
CPC ............ *G06F 3/044* (2013.01); *G06F 3/0416* (2013.01); *G06K 9/0002* (2013.01); *G06F 2203/04102* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 9,639,733 B2 * | 5/2017 | Kremin | ................ G06K 9/0002 |
| 2014/0333575 A1 | 11/2014 | Hu | |
| 2016/0188099 A1 | 6/2016 | Hu | |
| 2017/0075481 A1 | 3/2017 | Chou et al. | |

* cited by examiner

*Primary Examiner* — Gustavo Polo
(74) *Attorney, Agent, or Firm* — WPAT, PC

(57) ABSTRACT

A biological feature-sensing device for acquiring biological feature information by sensing a biological feature is provided. The biological feature-sensing device includes a capacitive touch panel and a control circuit. The capacitive touch panel includes signal transmitting lines and signal receiving lines. A first pitch of the signal transmitting lines or a second pitch of the signal receiving lines is greater than or equal to a minimum on-center spacing of the biological feature. The control circuit receives first and second voltage signals through two sets of signal receiving lines in response to first and second charge/discharge signals transmitted through two sets of signal transmitting lines, and generates a characteristic value according to the first and second voltage signals. Many characteristic values corresponding to different combinations of the signal transmitting lines and signal receiving lines are generated accordingly to form a characteristic value matrix representing the biological feature information.

24 Claims, 24 Drawing Sheets

Transmitting a first charge/discharge signal and a second charge/discharge signal through at least two sets of signal transmitting lines selected among M signal transmitting lines, respectively, and then receiving a first voltage signal and a second voltage signal through at least two sets of signal receiving lines selected among N signal receiving lines, respectively, during a first time period, and outputting a first voltage difference value or its equivalent function value by comparing the first and second voltage signals —101

Transmitting a third charge/discharge signal and a fourth charge/discharge signal through the at least two sets of signal transmitting lines, respectively, and then receiving a third voltage signal and a fourth voltage signal through the at least two sets of signal receiving lines, respectively, during a second time period, and outputting a second voltage difference value or its equivalent function value by comparing the third and fourth voltage signals —102

|       | $X_{-1}$ | $X_0$ | $X_1$ |
|-------|----------|-------|-------|
| $Y_{-1}$ | −      | +     | 0     |
| $Y_0$    | +      | −     | 0     |
| $Y_1$    | 0      | 0     | 0     |

FIG. 4A

|       | $X_{-1}$ | $X_0$ | $X_1$ |
|-------|----------|-------|-------|
| $Y_{-1}$ | −      | +     | 0     |
| $Y_0$    | 0      | 0     | 0     |
| $Y_1$    | +      | −     | 0     |

FIG. 4B

|       | $X_{-1}$ | $X_0$ | $X_1$ |
|-------|----------|-------|-------|
| $Y_{-1}$ | −      | 0     | +     |
| $Y_0$    | +      | 0     | −     |
| $Y_1$    | 0      | 0     | 0     |

FIG. 4C

|       | $X_{-1}$ | $X_0$ | $X_1$ |
|-------|----------|-------|-------|
| $Y_{-1}$ | −      | 0     | +     |
| $Y_0$    | 0      | 0     | 0     |
| $Y_1$    | +      | 0     | −     |

FIG. 4D

DEVICE AND METHOD FOR SENSING BIOLOGICAL FEATURE

FIELD OF THE INVENTION

The invention relates to a device and a method for sensing a biological feature, and more particularly to a device and a method for sensing a fingerprint.

BACKGROUND OF THE INVENTION

Recently, fingerprint recognition has been widely applied to mobile devices for authentication. For example, the technology is used to increase security of mobile payment, and fingerprint recognition module is necessary for mobile devices. The fingerprint recognition module is usually built in an integrated circuit (IC) chip because integrated circuit technology can provide sensor unit with small pitch which is advantageous to capture a fingerprint image with high resolution. Because the resolution of the fingerprint image should be at least make most of ridges in the fingerprint image distinguishable, the pitch (centre-to-centre distance) of a two-dimensional capacitive sensor unit is not greater than 50 µm. Since the linewidth is smaller than the pitch, the resistance of the narrow lines is high and the electrical property of the capacitive sensor unit is not satisfied. Moreover, the size of the IC chip with capacitive sensing function should be large enough to cover the fingerprint area. The IC chip in large size results in increasing production cost. Therefore, smaller IC chip is still adopted for cutting down the cost to provide a competitive product. However, such capacitive sensor unit is too small to capture an entire fingerprint image. Therefore, rapid and correct fingerprint recognition requires additional complicated technologies while adopting the smaller IC chip. It is desired to capture the entire fingerprint image with high resolution quickly and easily at low cost.

SUMMARY OF THE INVENTION

The present disclosure provides a biological feature-sensing device for acquiring biological feature information by sensing a biological feature having an uneven surface with a minimum on-center spacing between two adjacent relative extreme values. The biological feature-sensing device includes a capacitive touch panel and a control circuit electrically connected to the capacitive touch panel. The capacitive touch panel to be approached or touched with an object with the biological feature includes M signal transmitting lines and N signal receiving lines. A first pitch of the M signal transmitting lines or a second pitch of the N signal receiving lines is greater than or equal to the minimum on-center spacing. The control circuit transmits a first charge/discharge signal and a second charge/discharge signal through two sets of signal transmitting lines selected among the M signal transmitting lines, respectively, during a specified time period wherein the first charge/discharge signal and the second charge/discharge signal are out of phase; receives a first voltage signal and a second voltage signal through two sets of signal receiving lines selected among the N signal receiving lines, respectively, in response to the first charge/discharge signal and the second charge/discharge signal during the specified time period; generates a characteristic value corresponding to a neighboring region defined by the two sets of signal transmitting lines and the two sets of signal receiving lines according to the first voltage signal and the second voltage signal; repetitively performs the above three steps to generate a plurality of characteristic values corresponding to different neighboring regions defined by different combinations of the M signal transmitting lines and the N signal receiving lines to form a characteristic value matrix representing the biological feature information.

The present disclosure provides a biological feature-sensing method used with a capacitive touch panel for acquiring biological feature information by sensing a biological feature having an uneven surface with a minimum on-center spacing between two adjacent relative extreme values. The capacitive touch panel includes M signal transmitting lines and N signal receiving lines wherein a first pitch of the M signal transmitting lines or a second pitch of the N signal receiving lines is greater than or equal to the minimum on-center spacing. The biological feature-sensing method includes steps of: transmitting a first charge/discharge signal and a second charge/discharge signal through two sets of signal transmitting lines selected among the M signal transmitting lines, respectively, during a first time period wherein the first charge/discharge signal and the second charge/discharge signal are out of phase; receiving a first voltage signal and a second voltage signal through two sets of signal receiving lines selected among the N signal receiving lines, respectively, in response to the first charge/discharge signal and the second charge/discharge signal during the first time period; generating a first characteristic value corresponding to a neighboring region defined by the two sets of signal transmitting lines and the two sets of signal receiving lines according to the first voltage signal and the second voltage signal; and repetitively performing the above three steps to generate a plurality of first characteristic values corresponding to different neighboring regions defined by different combinations of the M signal transmitting lines and the N signal receiving lines to form a first characteristic value matrix representing the biological feature information.

BRIEF DESCRIPTION OF THE DRAWINGS

The disclosure will become more readily apparent to those ordinarily skilled in the art after reviewing the following detailed description and accompanying drawings, in which:

FIGS. 2A and 2B are a flowchart showing steps of an embodiment of a sensing method according to the present disclosure;

FIGS. 4A-4D are schematic diagrams showing examples of 3×3 pattern matrices;

DETAILED DESCRIPTION OF PREFERRED EMBODIMENTS

The disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
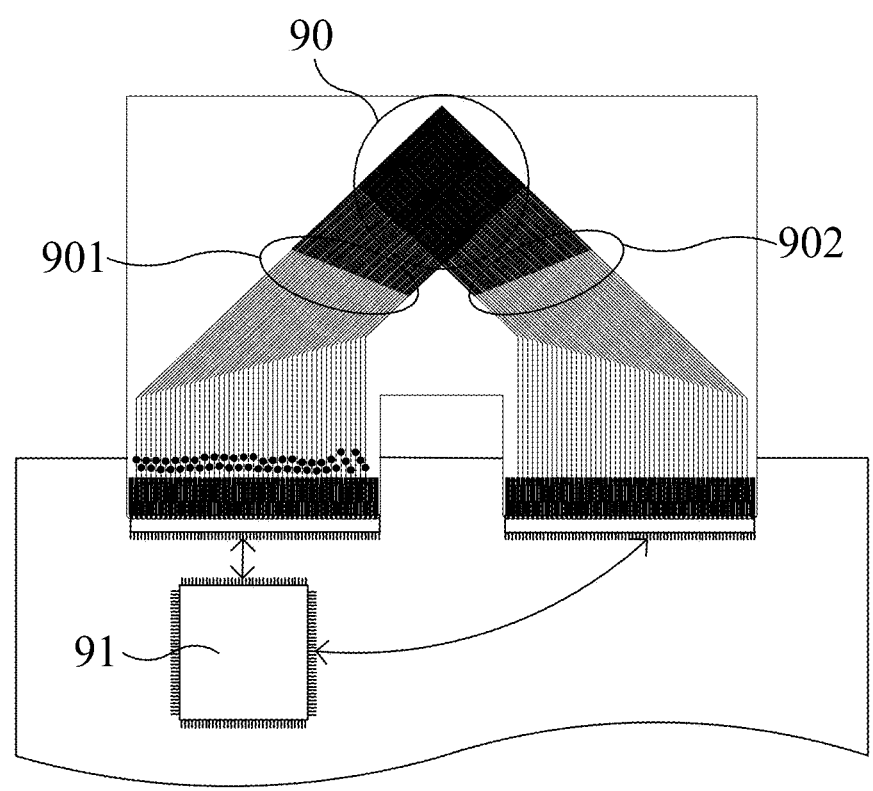
FIG. 1A is a schematic diagram illustrating a biological feature-sensing device according to the present disclosure.

Please refer to FIG. 1A which is a schematic diagram illustrating a biological feature-sensing device according to the present disclosure. The so-called biological feature is a rough epidermis of an object and has uniqueness. In the specification, a human fingerprint is taken as an example in the embodiments, but the biological feature described in the present disclosure is not limited to the human fingerprint. The present disclosure provides a capacitive touch panel including a capacitive sensor array 90. The capacitive sensor array 90 includes a first electrode group 901 (including M signal transmitting lines), a second electrode group 902 (including N signal receiving lines). The first electrode group 901 and the second electrode group 902 serve as transmitter electrodes and receiver electrodes, respectively, or vice versa. The first electrode group 901 or the second electrode group 902 serve as either of the transmitter electrodes and the receiver electrodes based on the driving scheme controlled by a control circuit 91 electrically connected to the capacitive sensor array 90. During operation of the biological feature-sensing device, an object having a biological feature, e.g. human fingerprint, to be recognized or identified approaches or touches the capacitive touch panel having the capacitive sensor array 90.

Figure 14:
FIG. 14 is a schematic diagram showing a human fingerprint image captured by the sensing method according to the present disclosure.

A fingerprint is made up of ridges which create an uneven or irregular epidermis of a human finger and depth distribution. A raised portion is called a ridge and a depressed portion is called a valley. An exemplified fingerprint image is shown in FIG. 14, and the ridge 1398 and the valley 1399 are respectively marked. The ridge 1398 and the valley 1399 are at different distances from the touch surface of the capacitive touch panel when the finger surface is approaching or touching the touch surface. Based on the variation of the distance, the capacitive touch panel can sense capacitance distribution over the capacitive sensor array 90 to acquire biological feature information corresponding to the fingerprint. The ridges and the valleys may be considered as relative extreme values (local maximum and local minimum are known collectively as local extremum). There is an on-center spacing (pitch) between any two adjacent local maximum or local minimum. The minimum of the on-center spacing determines the pitch of the signal lines of the capacitive sensor array 90. In the conventional sensing device, the pitch of the signal lines of the capacitive sensor array should be smaller than the minimum on-center spacing to clearly sense the fingerprint for further recognition. The present disclosure teaches away from the conventional technology. There is a first pitch between any two adjacent signal transmitting lines among the M signal transmitting lines, and there is a second pitch between any two adjacent signal receiving lines among the N signal receiving lines. At least one of the first pitch and the second pitch is greater than or equal to the minimum on-center spacing. Certainly, the condition that both pitches are greater than or equal to the minimum on-center spacing is applicable. It is to be noted that the fingerprint pattern described in the specification is not limited to a visual image. For example, the fingerprint pattern may be expressed in numerical values which indicate the relation between parameters and positions corresponding to the fingerprint.

According to the present disclosure, the pitch (centre-to-centre distance) of the first electrode group 901 and/or the pitch of the second electrode group 902 ranges from 150 μm to 200 μm. Compared with the conventional capacitive sensor array with a pitch of 50 μm, the linewidth of the two-dimensional sensor unit of the present disclosure is designed to be greater than 50 μm to provide better electrical property. Semiconductor process or other expensive lithography is not required while manufacturing the capacitive sensor array within such linewidth range. Therefore, the present disclosure can adopt a cheaper method such as a printing method using a printable conductive ink (e.g. silver paste, conductive carbon ink, silver carbon paste) because the recent printing method can support a linewidth of about 100 μm. Furthermore, the first electrode group 901 and the second electrode group 902 can be printed on two surfaces of a flexible substrate to form a flexible printed circuit (FPC). It is not necessary to provide a semiconductor IC chip in large size to embed the capacitive sensor array therein. Thus, the production cost is significantly decreased. Moreover, the capacitive sensor array may be integrated into a flexible sheet such as a card, and does not crack as easily as the semiconductor IC chip.

The sensing method for sensing the fingerprint includes the following steps. During a specified time period, the control circuit 91 transmits a first charge/discharge signal and a second charge/discharge signal through two sets of signal transmitting lines selected among the M signal transmitting lines of the capacitive sensor array 90, respectively. The first charge/discharge signal and the second charge/discharge signal are out of phase. Then, the control circuit 91 receives a first voltage signal and a second voltage signal through two sets of signal receiving lines selected among the N signal receiving lines, respectively. The control circuit 91 generates and outputs a characteristic value corresponding to a neighboring region defined by the four sets of signal lines. After repeating the above three steps corresponding to different neighboring regions defined by different combinations of the signal lines, a plurality of characteristic values are generated to form a characteristic value matrix representing the biological feature information. In this embodiment, the characteristic value matrix represents the fingerprint pattern. In the fingerprint pattern (or fingerprint image) obtained by this sensing method, each ridge and each valley of the fingerprint can be distinguishes to achieve high quality fingerprint recognition.

Figure 1B:
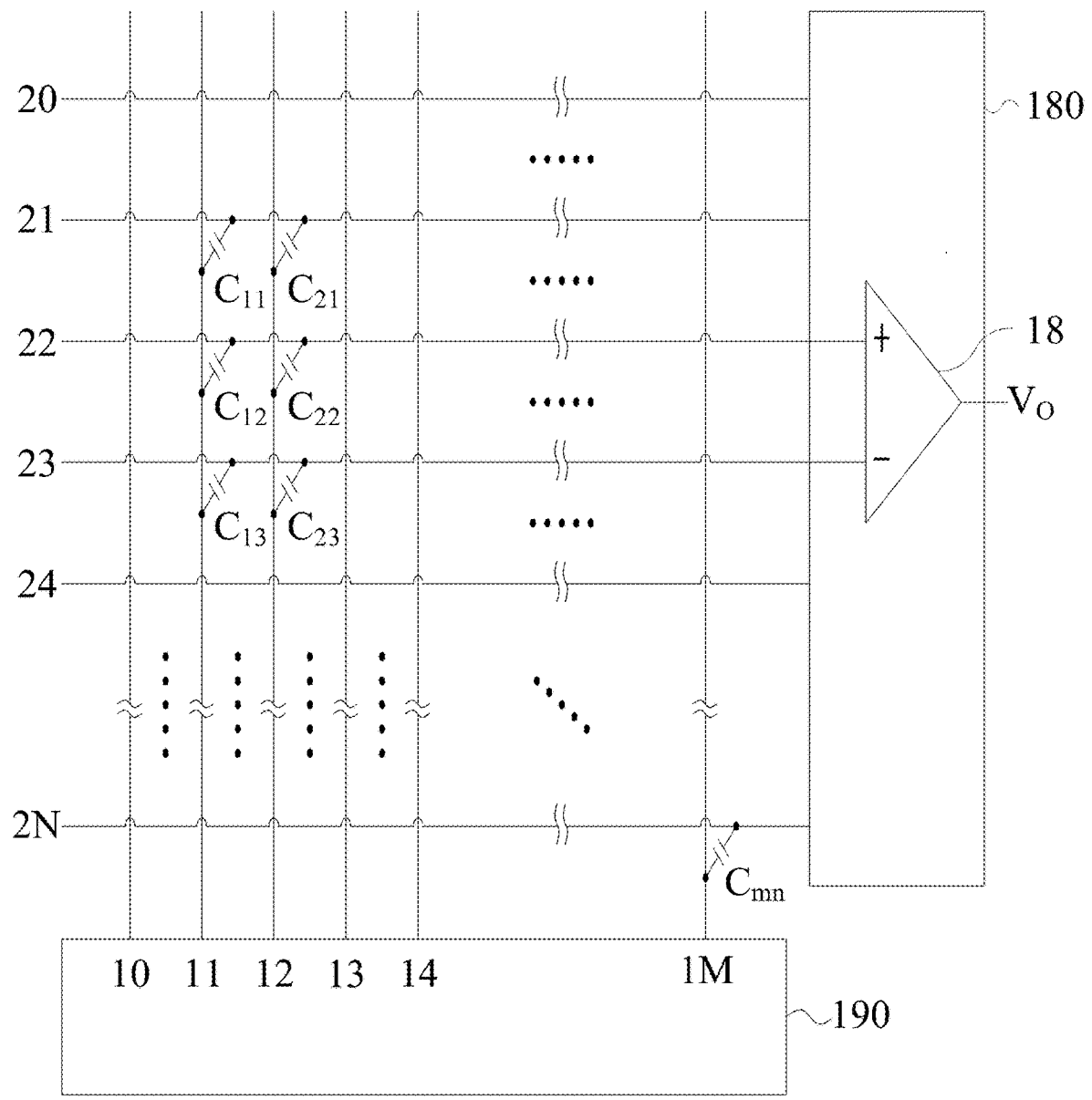
FIG. 1B is a circuit diagram illustrating a capacitive touch panel of the biological feature-sensing device according to the present disclosure.

Please refer to FIG. 1B, in which circuitry of the capacitive touch panel of the biological feature-sensing device is schematically illustrated. As shown, M signal transmitting lines 11~1M and N signal receiving lines 21~2N are vertically and horizontally allocated, respectively, and M×N capacitors C11~Cmn are formed at neighboring regions defined by the signal lines (i.e. the M signal transmitting lines 11~1M and the N signal receiving lines 21~2N). The neighboring region in this embodiment is a crossover region of two selected signal transmitting line and two selected signal receiving line. In another embodiment, the signal transmitting lines and the signal receiving lines form a single-layer structure, and the neighboring region includes vicinity surrounded by two selected signal transmitting lines and two selected signal receiving lines. Proximity of the ridge/valley of the human finger to one of the capacitors C11~Cmn or physical contact of the ridge/valley of the human finger with one of the capacitors C11~Cmn will result in a capacitance change of the capacitor. According to the sensing method of the present disclosure, the capacitors can effectively function at capacitances of about 100 fF~10 pF. This shows that the present disclosure achieves a considerable improvement as compared to prior art which can only function effectively at 1~5 pF. The control circuit 91 basically includes a charge/discharge signal generator 190 and a voltage signal processor 180. The charge/discharge signal generator 190 is electrically connected to the M signal transmitting lines 11~1M for generating the charge/discharge signals, and the voltage signal processor 180 is electrically connected to the N signal receiving lines 21~2N for receiving and further processing the voltage signals received from the signal receiving lines 21~2N. In order to ameliorate the conventional sensing method, a sensing method used with the biological feature-sensing device is provided and the steps are shown in the flowchart of FIGS. 2A and 2B.

Figure 2B:
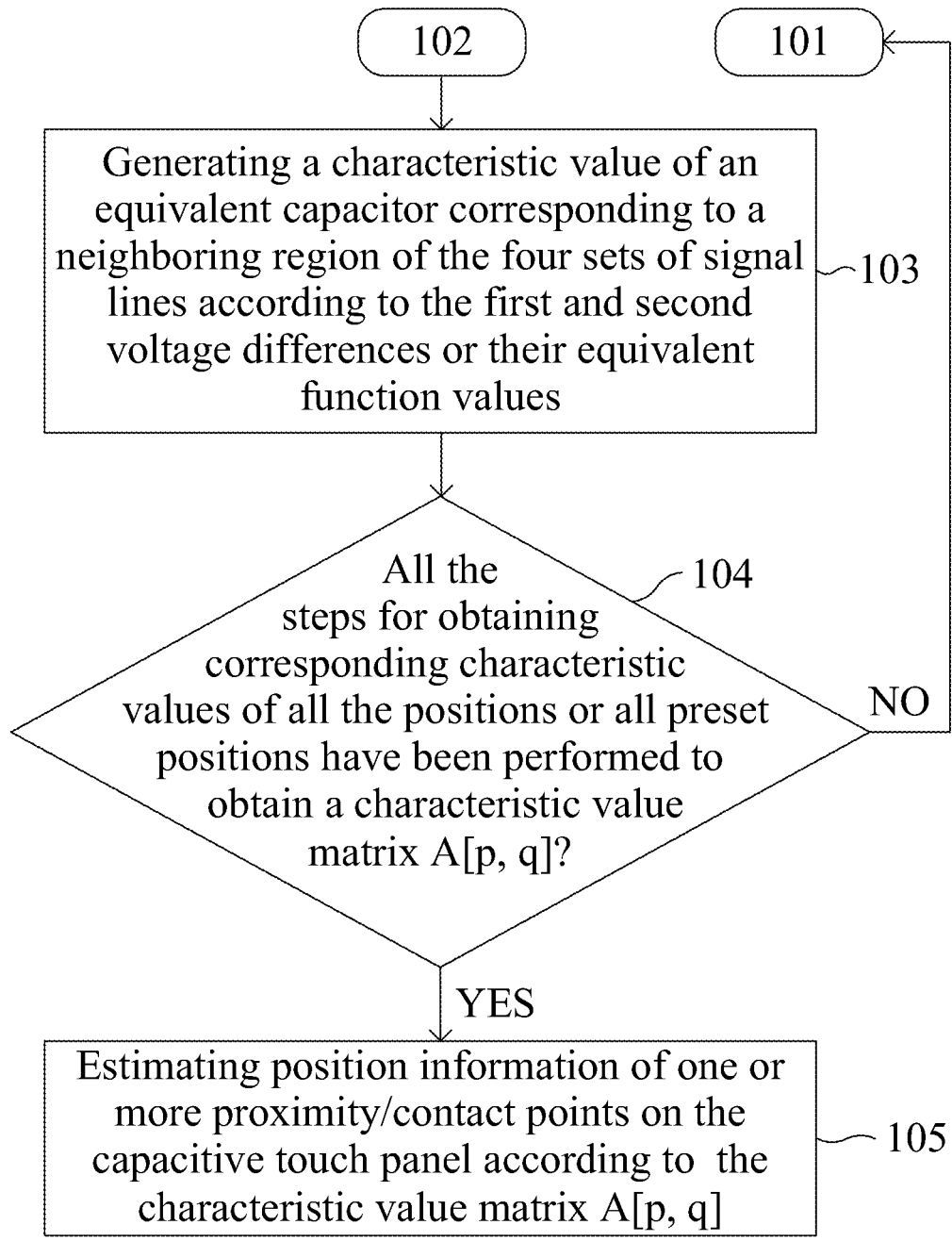

As shown in FIGS. 2A and 2B, in Step 101, the charge/discharge signal generator 190 transmits a first charge/discharge signal and a second charge/discharge signal through at least two sets of signal transmitting lines selected among the M signal transmitting lines 11~1M, respectively; and then the voltage signal processor 180 receives a first voltage signal and a second voltage signal, which are generated in response to the first charge/discharge signal and the second charge/discharge signal, through at least two sets of signal receiving lines selected among the N signal receiving lines, respectively. Step 101 is performed during a first time period. For example, the two sets of signal transmitting lines are two adjacent signal transmitting lines 12, 13, while the two sets of signal receiving lines are two adjacent signal receiving lines 22, 23. The first charge/discharge signal may be a charge signal rising from 0V to 3V, and the second charge/discharge signal may be a discharge signal falling from 3V to 0V (referring to FIG. 3B). The first charge/discharge signal and the second charge/discharge signal are out of phase, e.g. in antiphase in this example. The first voltage signal and the second voltage signal respectively received from the two adjacent signal receiving lines 22, 23 are compared in a comparator circuit 18 shown in FIG. 1B and then a first voltage difference value or a first function value equivalent to the first voltage difference value is generated and outputted via an output terminal $V_O$ according to the comparison result of the first voltage signal and the second voltage signal. For example, the first function value is with the same polarity but nonlinear to the first voltage difference value and obtained through another comparing method or circuit; or the first function value is derived from the first voltage difference value by adjusting the levels of the first charge/discharge signal and the second charge/discharge signal. The details will be described below.

Next, in Step 102, the charge/discharge signal generator 190 transmits a third charge/discharge signal and a fourth charge/discharge signal through the at least two sets of signal transmitting lines, respectively; and then the voltage signal processor 180 receives a third voltage signal and fourth voltage signal, which are generated in response to the third charge/discharge signal and the fourth charge/discharge signal, through the at least two sets of signal receiving lines, respectively. Step 102 is performed during a second time period other than the first time period. The at least two sets of signal transmitting lines are the two adjacent signal transmitting lines 12, 13, while the at least two sets of signal receiving lines are the two adjacent signal receiving lines 22, 23. The third charge/discharge signal may be a discharge signal falling from 3V to 0V, while the fourth charge/discharge signal may be a charge signal rising from 0V to 3V (referring to FIG. 3B). The third charge/discharge signal and the fourth charge/discharge signal are out of phase, e.g. in antiphase in this example. The third voltage signal and the fourth voltage signal respectively received from the two adjacent signal receiving lines 22, 23 are also compared in the comparator circuit 18 shown in FIG. 1B so as to generate and output a second voltage difference value or a second function value equivalent to the second voltage difference value via the output terminal $V_O$ according to the comparison result of the third voltage signal and the fourth voltage signal. For example, the second function value is with the same polarity but nonlinear to the second voltage difference value and obtained by another comparing method or circuit; or the second function value is derived from the second voltage difference value by adjusting the levels of the third charge/discharge signal and the fourth charge/discharge signal. The details will be described below.

Next, in Step 103, the voltage signal processor 180 generates a characteristic value of an equivalent capacitor at a neighboring region of the four sets of signal lines according to the first voltage difference value or its equivalent function value and the second voltage difference value or its equivalent function value. In this embodiment, the characteristic value of the equivalent capacitor corresponds to the crossover region of the adjacent signal transmitting lines 12, 13 and the adjacent signal receiving lines 22, 23. For example, the characteristic value of the capacitor C22 is defined as the difference obtained by subtracting the second voltage difference value or the second function value from the first voltage difference value or the second function value.

The voltage signal processor 180 repeats the Steps 101~103 for different combinations of the signal transmitting lines and the signal receiving lines, e.g. adjacent signal transmitting lines and adjacent signal receiving lines, to generate and output a plurality of characteristic values, thereby obtaining a characteristic value matrix A[p, q]. Afterwards, the characteristic value matrix A[p, q] can be used to estimate position information of one or more proximity/contact points on the capacitive touch panel, wherein each proximity/contact point is the position which a ridge (raised portion) of the human fingerprint (or other biological feature) approaches or touches on the capacitive-type panel. In Step 104, if corresponding characteristic values of all the positions or all preset positions have been obtained, the method proceeds to Step 105.

In Step 105, the position information of one or more proximity/contact points on the capacitive touch panel are estimated according to data pattern of the characteristic value matrix A[p, q]. The proximity/contact point is the position which a ridge (raised portion) of the human fingerprint (or other biological feature) approaches or touches on the capacitive touch panel. Step 105 can be performed in a control circuit chip including the voltage signal processor 180. Alternatively, the characteristic value matrix A[p, q] can be transmitted to an information system connected to the capacitive touch panel, for example, a notebook computer, a tablet computer, a smart phone, etc. In this example, Step 105 is executed in the information system.

The details of the above-mentioned technology will be described hereinafter with reference to FIGS. 3A and 3B. However, the present disclosure is not limited to the following examples. In the above-mentioned embodiment, a sensing operation involves two adjacent signal transmitting lines and two adjacent signal receiving lines, so it can be assumed that a scan window 200 covering the crossover region defined by four signal lines (e.g. two adjacent signal transmitting lines and two adjacent signal receiving lines) moves over the capacitive touch panel for scanning. When the scan window 20 moves to cover the crossover region defined by the signal lines $X_0$, $X_1$, $Y_0$, $Y_1$, and the proximity/contact point is located at an intersection position 1 of the signal lines $X_1$ and $Y_0$ at the upper right corner of the scan window 200, the first voltage difference value and the second voltage difference value obtained in Step 101 and Step 102 are +ΔV and −ΔV, respectively. Accordingly, the characteristic value obtained in Step 103 (i.e. subtracting the second voltage difference value from the first voltage difference value) is +2ΔV. In another case, the proximity/contact point is located at an intersection position 2 of the signal lines $X_1$ and $Y_1$ at the lower right corner of the scan window 200, the first voltage difference value and the second voltage difference value obtained in Step 101 and Step 102 are −ΔV and +ΔV, respectively. Accordingly, the characteristic value obtained in Step 103 (i.e. subtracting the second voltage difference value from the first voltage difference value) is −2ΔV. In a further case, the proximity/contact point is located at an intersection position 3 of the signal lines $X_0$ and $Y_1$ at the lower left corner of the scan window 200, the first voltage difference value and the second voltage difference value obtained in Step 101 and Step 102 are +ΔV and −ΔV, respectively. Accordingly, the characteristic value obtained in Step 103 (i.e. subtracting the second voltage difference value from the first voltage difference value) is +2ΔV. Likewise, in the case that the proximity/contact point is located at an intersection position 4 of the signal lines $X_0$ and $Y_0$ at the upper left corner of the scan window 200, the first voltage difference value and the second voltage difference value obtained in Steps 101 and 102 are −ΔV and +ΔV, respectively. Accordingly, the characteristic value obtained in Step 103 (i.e. subtracting the second voltage difference value from the first voltage difference value) is −2ΔV.

Figure 3A:
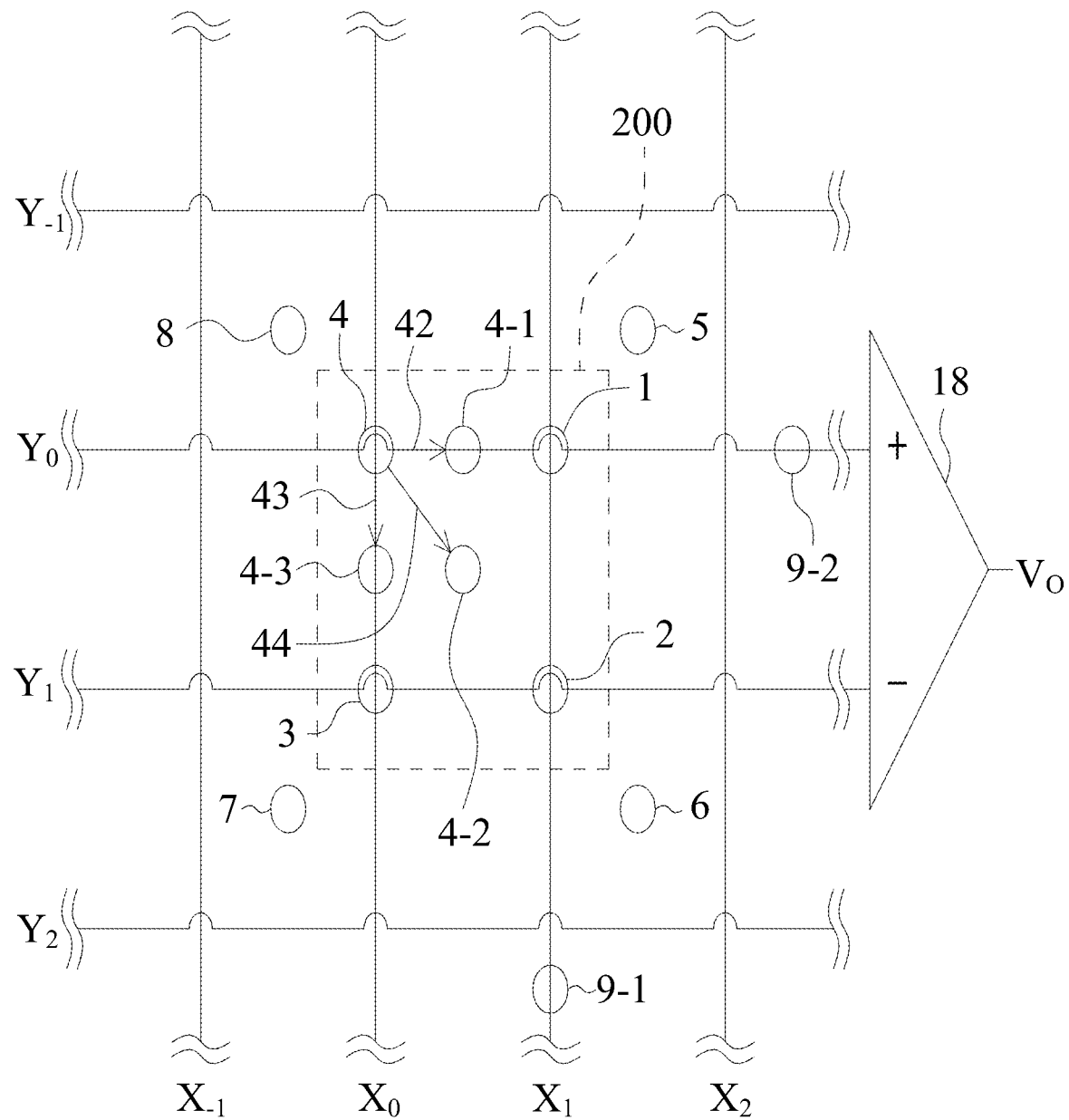
FIG. 3A is a schematic diagram illustrating a portion of the capacitive touch panel of FIG. 1 operated with the sensing method of FIGS. 2A and 2B.

If the proximity/contact point is located at one of positions 5, 6, 7, 8 outside the scan window 200 as shown in FIG. 3A, the characteristic value obtained in Steps 101~103 in each case will have the same polarity as the corresponding position 1, 2, 3, or 4 but a smaller absolute value.

Furthermore, if the proximity/contact point is located at a position 9-1 outside the scan window 200 as shown in FIG. 3A, the first voltage difference value obtained in Step 101 and the second voltage difference value obtained in Step 102 will both be 0 on a condition that the charge/discharge signal on the signal transmitting lines is strong enough. Accordingly, the characteristic value obtained by subtracting the second voltage difference value from the first voltage difference value in Step 103 is 0. In a further example that the proximity/contact point is located at a position 9-2 outside the scan window 200 as shown in FIG. 3A, since the first voltage difference value obtained in Step 101 and the second voltage difference value obtained in Step 102 are respectively −ΔV and −ΔV, the characteristic value obtained by subtracting the second voltage difference value from the first voltage difference value in Step 103 is 0. In this case that the window 20 is located at the crossover region defined by the signal lines $X_0$, $X_1$, $Y_0$, $Y_1$, if there is no proximity/contact point within the neighboring region, or the proximity/contact point is located at one of positions 4-1, 4-2, 4-3, the characteristic value obtained in Steps 101~103 is 0.

In this way, after the scan window 200 defined with 2×2 signal lines has moved to scan the whole capacitive touch panel, a characteristic value matrix A[p, q] storing a plurality of characteristic values is generated, wherein each characteristic value corresponds to one scan window position. Each characteristic value may be a positive number, a negative number or zero, or simply represented by symbol +, − or 0.

In Step 105, an analysis is then performed according to the data pattern of the characteristic value matrix A[p, q] to estimate the position information of one or more proximity/contact points on the capacitive touch panel. The proximity/contact point is the position at which a ridge (raised portion) of the human fingerprint (or other biological feature) approaches or touches the capacitive touch panel. For example, if there is no finger approaching or touching the capacitive touch panel, all of the characteristic values recorded in the characteristic value matrix A[p, q] as obtained in the scanning steps during a preset time period are 0. On the other hand, if a ridge of the fingerprint is approaching or touching the intersection position of the signal transmitting line $X_0$ and the signal receiving line $Y_0$ of the capacitive touch panel, the characteristic value corresponding to the specified position and eight characteristic values corresponding to eight surrounding positions form a 3×3 pattern matrix as shown in FIG. 4A. Therefore, if a 3×3 submatrix in the characteristic value matrix A[p, q] meets a first pattern matrix (e.g. the pattern matrix as shown in FIG. 4A) and corresponds to the signal lines $X_0$, $X_1$, $Y_0$, $Y_1$, it is determined that the estimated proximity/contact point is at position $(X_0, Y_0)$ with a first offset vector of $\overline{0}$. That is, when the characteristic value matrix A[p, q] includes a pattern matrix as shown in FIG. 4A, it is realized that there is a proximity/contact point at position $(X_0, Y_0)$. If the characteristic value matrix A[p, q] includes more than one submatrix similar to the pattern matrix as shown in FIG. 4A, it is realized that more than one proximity/contact point are present at intersection positions of corresponding signal transmitting lines and corresponding signal receiving lines.

In addition, when the characteristic value matrix A[p, q] has a submatrix similar to any one pattern matrix shown in FIGS. 4B-4D, it is also estimated that there exists one proximity/contact point near the intersection position. The proximity/contact point deviates from the intersection position $(X_0, Y_0)$ with a second offset vector 42, a third offset vector 43, or a fourth offset vector 44. For example, the pattern matrix shown in FIG. 4B indicates that the proximity/contact point is located below the intersection position $(X_0, Y_0)$ (e.g. position 4-3 in FIG. 3A), the pattern matrix shown in FIG. 4C indicates that the proximity/contact point is located on the right side of the intersection position $(X_0, Y_0)$ (e.g. position 4-1 in FIG. 3A), and the pattern matrix shown in FIG. 4D indicates that the proximity/contact point is located to the lower right of the intersection position $(X_0, Y_0)$ (e.g. position 4-2 in FIG. 3A). Therefore, at the same routing density, the resolution can be increased to two times in both directions, and thus the overall resolution can be increased to four times. Thus, according to the present disclosure, patterns of fingerprint, palm print or other biological feature with high resolution can be obtained at reduced routing density.

Figure 3B:
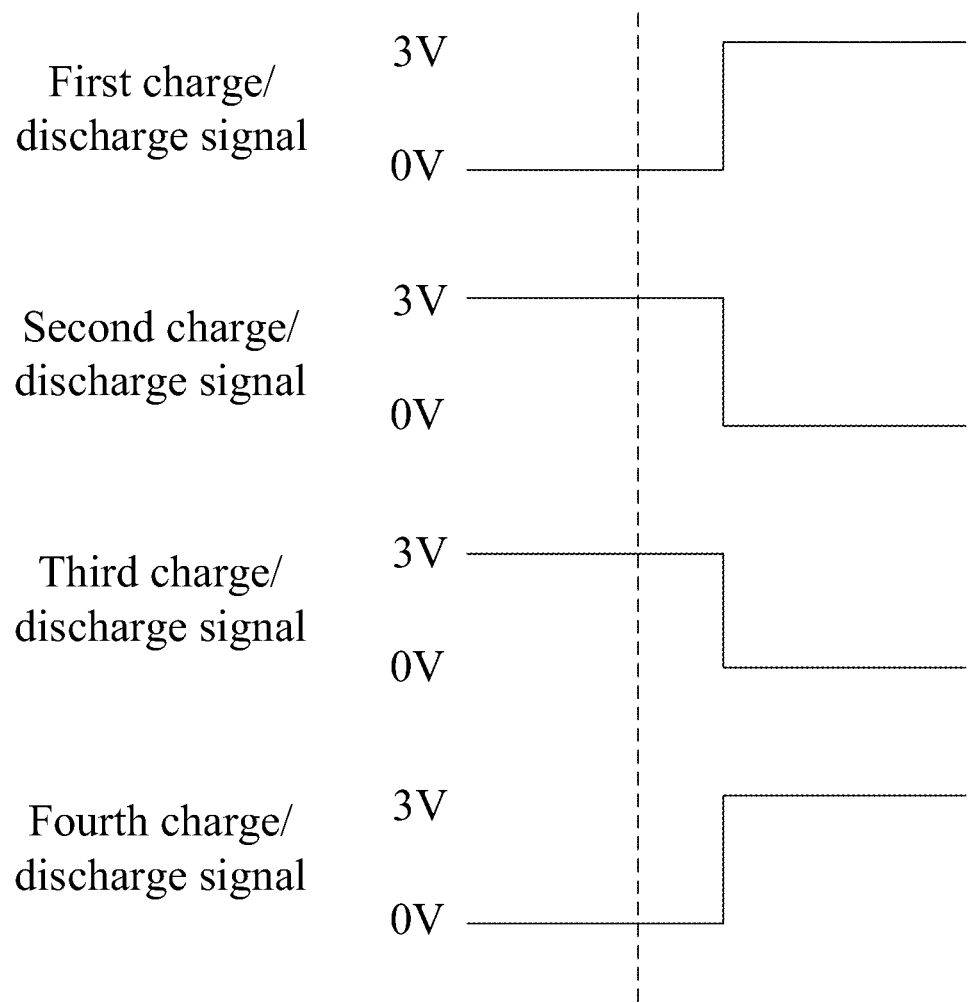
FIG. 3B is a waveform diagram showing signals associated with the sensing method in connection with FIGS. 2A and 2B.

The examples of the charge/discharge signals shown in FIG. 3B are only for illustration, and it is not limited to falling from 3V to 0V and rising from 0V to 3V. It is also feasible, for example, with one falling from a larger fixed voltage to a smaller fixed voltage while the other rising from another smaller fixed voltage to another larger fixed voltage. The fixed voltages of 0V and 3V can maintain the balance in the circuit design.

Since the position detection is performed with two adjacent signal transmitting lines and two adjacent signal receiving lines, dummy signal lines 10, 20 (FIG. 1) are provided at corresponding edges of the capacitive touch panel, so as to perform the above-mentioned operation with the signal transmitting line 11 and the signal receiving line 21. It is not necessary for the dummy signal lines 10, 20 to form capacitive coupling with the finger so that the dummy signal lines 10, 20 may be disposed outside the touch area of the capacitive touch panel. Of course, it is also possible to omit the dummy signal lines, and directly map the signal transmitting line 12 and the signal receiving line 22 to be virtual dummy signal lines 10, 20, so as to perform the above-mentioned operation with the signal transmitting line 11 and the signal receiving line 21.

Figure 5:
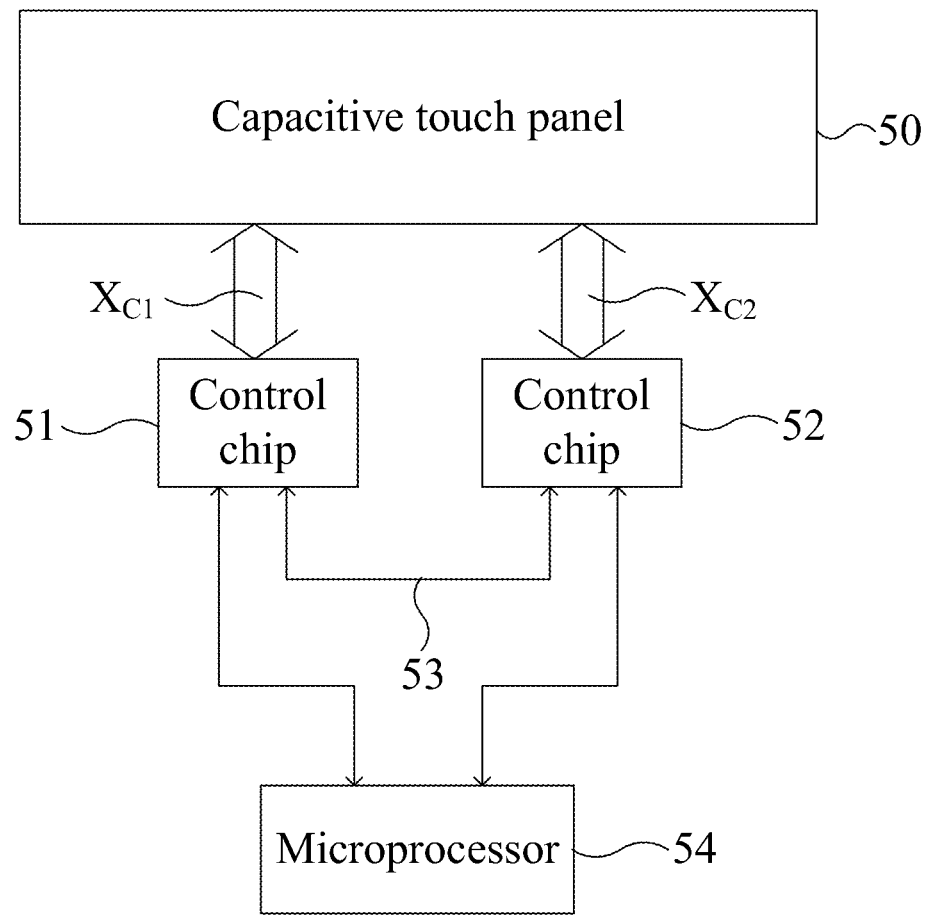
FIG. 5 is a functional block diagram schematically showing a capacitive touch panel controlled by multiple control chips according to an embodiment of the present disclosure.

Please refer to FIG. 5, which is a functional block diagram schematically showing that a capacitive touch panel 50 is controlled by multiple control chips 51, 52 according to an embodiment of the present disclosure. Two control chips are used in this embodiment, wherein signals on a first plurality of sets of signal transmitting or receiving lines $X_{C1}$ are processed by the control chip 51, and signals on other sets of signal transmitting or receiving lines $X_{C2}$ are processed by the control chip 52. A reference voltage transmission line 53 is disposed between the control chips 51, 52 so as to transmit a reference voltage signal to all control chips 51, 52 as a reference. By this way, when performing comparison operation to the voltage signals, which are received from the signal receiving lines connected to different control chips, a consistent reference voltage is provided. The voltage difference values obtained in Steps 101, 102 or the characteristic value obtained in Step 103 can be transmitted by the control chips 51, 52 to a microprocessor 54 at back end to estimate corresponding position information of the proximity/contact point.

Figure 6:
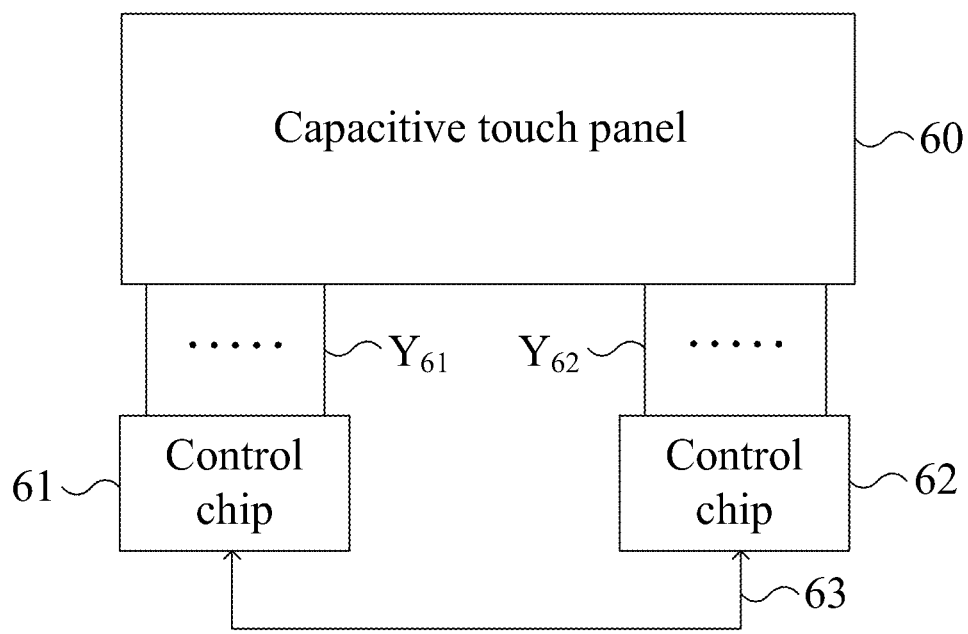
FIG. 6 is a functional block diagram schematically showing a capacitive touch panel controlled by multiple control chips according to another embodiment of the present disclosure.
Figure 7:
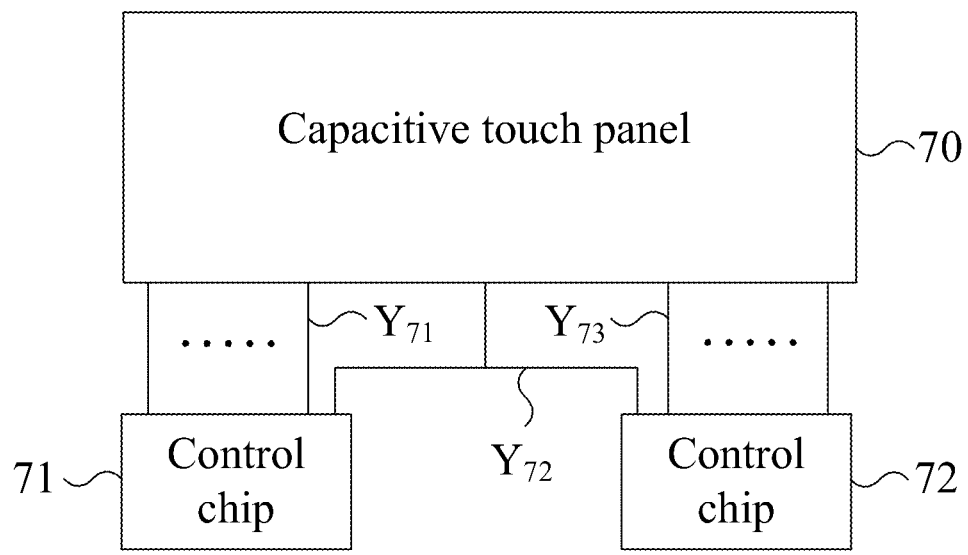
FIG. 7 is a functional block diagram schematically showing a capacitive touch panel controlled by multiple control chips according to a further embodiment of the present disclosure.

Please refer to FIG. 6. If the scan window covers at least two adjacent signal receiving lines $Y_{61}$, $Y_{62}$ of a capacitive touch panel 60 which are connected to different control chips 61, 62, a signal transmission line (for example, transmission line 63 in FIG. 6) interconnecting the chips 61, 62 with each other can be used to transmit a voltage signal from adjacent one or more signal lines to the other control chip as a reference. On the other way, as shown in FIG. 7, a signal receiving line $Y_{72}$ located between signal receiving lines $Y_{71}$ and $Y_{73}$ of a capacitive touch panel 70 is connected to different control chips 71, 72, so that a voltage signal from the signal receiving line $Y_{72}$ can be referenced by both control chips 71, 72.

Figure 8:
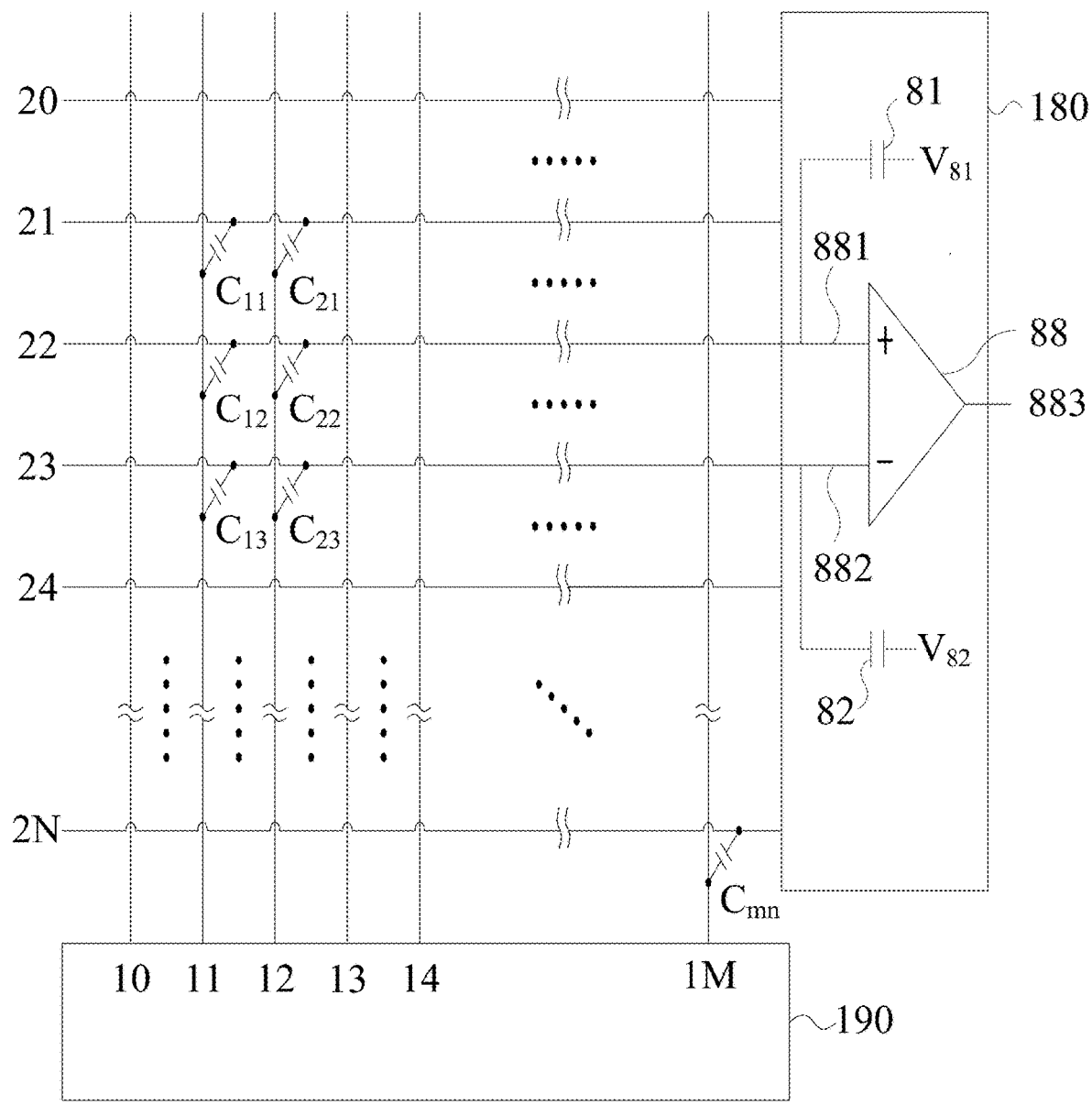
FIG. 8 is a schematic diagram illustrating another embodiment of a biological feature-sensing device according to the present disclosure.

Further, please refer to FIG. 8, which is a schematic diagram illustrating another embodiment of a biological feature-sensing device according to the present disclosure. A first capacitor 81, a second capacitor 82 and a comparator 88 are used to perform another comparing method. In detail, in Step 101, the charge/discharge signal generator 190 transmits the first charge/discharge signal and the second charge/discharge signal through at least two sets of signal transmitting lines selected among the M signal transmitting lines 11~1M, respectively; and then the voltage signal processor 180 receives the first voltage signal and the second voltage signal, which are generated in response to the first charge/discharge signal and the second charge/discharge signal, through at least two sets of signal receiving lines selected among the N signal receiving lines, respectively. Step 101 is performed during the first time period. For example, the at least two sets of signal transmitting lines are two adjacent signal transmitting lines 12, 13, while the at least two sets of signal receiving lines are two adjacent signal receiving lines 22, 23. The first charge/discharge signal may be a charge signal rising from 0V to 3V, and the second charge/discharge signal may be a discharge signal falling from 3V to 0V (refer to FIG. 3B). As for the first voltage signal and the second voltage signal respectively received from the adjacent two signal receiving lines 22, 23, two input terminals 881, 882 of the comparator 88 are balanced by controlling an input voltage $V_{81}$ to the first capacitor 81 and an input voltage $V_{82}$ to the second capacitor 82 so that the voltage outputted from an output terminal 883 is substantially zero. When the input terminals 881, 882 are balanced, the difference between the input voltages $V_{81}$ and $V_{82}$ is recorded as the first voltage difference value. Alternatively, under equal input voltages $V_{81}$ and $V_{82}$, two input terminals 881, 882 of the comparator 88 are balanced by controlling the capacitances of the first capacitor 81 and the second capacitor 82 so that the voltage outputted from the output terminal 883 is substantially zero. When the input terminals 881, 882 are balanced, the difference of the capacitances of the first capacitor 81 and the second capacitor 82 is recorded as the first function value equivalent to the first voltage difference value. Here, the comparator circuit 18 shown in FIG. 1 needs to be implemented by an analog-to-digital converter; however, the comparator 88 can be simply implemented by a single bit comparator.

Further, in Step 102, the charge/discharge signal generator 190 transmits the third charge/discharge signal and the fourth charge/discharge signal through the at least two sets of signal transmitting lines, respectively; and then the voltage signal processor 180 receives the third voltage signal and the fourth voltage signal, which are generated in response to the third charge/discharge signal and the fourth charge/discharge signal, through the at least two sets of signal receiving lines, respectively. Step 102 is performed during the second time period other than the first time period. That is, the at least two sets of signal transmitting lines are the two adjacent signal transmitting lines 12, 13, while the at least two sets of signal receiving lines are the two adjacent signal receiving lines 22, 23. The third charge/discharge signal may be a discharge signal falling from 3V to 0V, and the fourth charge/discharge signal may be a charge signal rising from 0V to 3V (referring to FIG. 3B). As for the third voltage signal and the fourth voltage signal respectively received from the adjacent two signal receiving lines 22, 23, the two input terminals 881, 882 of the comparator 88 are balanced by controlling the input voltages $V_{81}$ of the first capacitor 81 and the input voltage $V_{82}$ of the second capacitor 82 so that the voltage outputted from the output terminal 883 is substantially zero. When the input terminals 881, 882 are balanced, the difference between the input voltages $V_{81}$ and $V_{82}$ is recorded as the second voltage difference value. Alternatively, under equal input voltages $V_{81}$ and $V_{82}$, the two input terminals 881, 882 of the comparator 88 are balanced by controlling the capacitances of the first capacitor 81 and the second capacitor 82 so that the voltage outputted from the output terminal 883 is substantially zero. When the input terminals 881, 882 are balanced, the difference of the capacitances of the first capacitor 81 and the second capacitor 82 is recorded as the second function value equivalent to the second voltage difference value.

Two adjacent signal lines are taken as examples for description in the above embodiments. Alternatively, the charge/discharge signals may be transmitted through two or more sets of signal transmitting lines selected among the M signal transmitting lines, respectively. Then the voltage signals generated in response to the charge/discharge signals are received through two or more sets of signal receiving lines selected among the N signal receiving lines. Each set of signal transmitting lines may consist of a single signal transmitting line or a plurality of signal transmitting lines. The two sets of signal transmitting lines may be not adjacent to each other, and one or more signal transmitting lines are disposed between the two sets of signal transmitting lines. Similarly, each set of signal receiving lines may consist of a single signal receiving line or a plurality of signal receiving lines. The two sets of signal receiving lines may be not adjacent to each other, and one or more signal receiving lines are disposed between the two sets of signal receiving lines. Sensitivity and sensing distance for sensing can be increased if each set of signal transmitting/receiving lines consists more than one signal transmitting/receiving lines, so that the proximity of a conductive object to the capacitive touch panel can be sensed without direct touch. In another embodiment, the charge/discharge signals are transmitted through two or more sets of signal transmitting lines selected among N signal transmitting lines, respectively; and the voltage signals generated in response to the charge/discharge signals are received through two or more sets of signal receiving lines selected among M signal receiving lines. The interchange of the signal transmitting lines and the signal receiving lines may be achieved by a multiplexer (not shown) to change the line connections. The voltage signal processor 180 may be constituted by two or more analog-to-digital converters or a single bit comparator, and the two or more analog-to-digital converters may be disposed in different chips. Since this is a common modification in the circuit design, and will not be further described herein. Related disclosure has been described in US 2014/0333575 A1, and the contents of which are hereby incorporated herein by reference.

As described above, a proximity/contact point on the capacitive touch panel is sensed by receiving a first voltage signal and a second voltage signal through two sets of signal receiving lines selected among the N signal receiving lines in response to a first charge/discharge signal and a second charge/discharge signal transmitted through two sets of signal transmitting lines selected among the M signal transmitting lines, respectively, during a first time period; receiving a third voltage signal and a fourth voltage signal through the two sets of signal receiving lines in response to a third charge/discharge signal and a fourth charge/discharge signal transmitted through the two sets of signal transmitting lines, respectively, during a second time period; and generating a characteristic value for a neighboring region defined by the two sets of signal transmitting lines and the two sets of signal receiving lines according to the first voltage signal, the second voltage signal, the third voltage signal and the fourth voltage signal; wherein the above three steps are repetitively performed so as to generate a plurality of characteristic values for a plurality of neighboring regions defined by different combinations of the M signal transmitting lines and the N signal receiving lines, and position information of at least one proximity/contact point on the capacitive touch panel is estimated according to the characteristic values. Accordingly, position information of the proximity/contact point can be accurately sensed without increasing the number of signal lines. Such dual-line sensing technology can effectively eliminate noise and increase the resolution of fingerprint pattern (pattern image).

Different from the sensing method performing two-stage charge/discharge operations as described above, another sensing method performing a single-stage charge/discharge operation is provided according to the present disclosure, which is advantageous in relatively high scanning rate and low power consumption. An embodiment of a method for sensing a proximity/contact point on a capacitive touch panel, which performs a single-stage charge/discharge operation, will be described hereinafter with reference to FIG. 9.

The sensing method can also be applied to a capacitive touch panel having a structure similar to that shown in FIG. 1, wherein M signal transmitting lines 11~1M and N signal receiving lines 21~2N are vertically and horizontally allocated, respectively, and MxN capacitors C11~Cmn are formed at neighboring regions of the signal lines. Two adjacent signal transmitting lines (e.g. signal transmitting lines $X_0$, $X_1$) and two adjacent signal receiving lines (e.g. signal receiving lines $Y_0$, $Y_1$) are considered as one unit to be sensed, and a scan window 200 covering the crossover region (or neighboring region) defined by the four signal lines is marked in the diagram. The scan window 200 will move over the capacitive touch panel for scanning.

Figure 10:
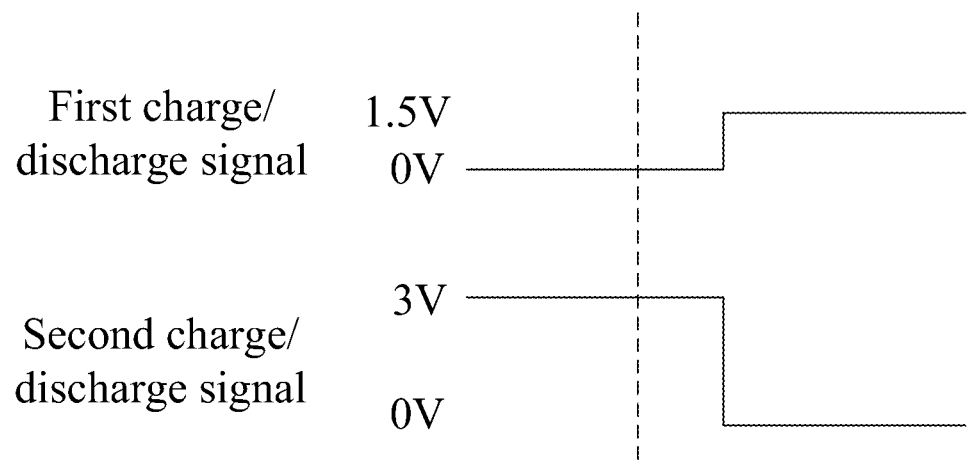
FIG. 10 is a waveform diagram showing signals associated with another sensing method according to the present disclosure.

The single-stage charge/discharge operation and the two-stage charge/discharge operation are different in driving ways. Referring to the example illustrated in the flowchart of FIGS. 2A and 2B, the two-stage charge/discharge operation performs a first charge/discharge step 101 with a first charge/discharge signal and a second charge/discharge signal during a first time period, and a second charge/discharge step 102 with a third charge/discharge signal and a fourth charge/discharge signal during a second time period. In contrast, the single-stage charge/discharge operation omits one of Steps 101 and 102. For example, Step 102 is omitted, and only Step 101 is performed by inputting the first charge/discharge signal and the second charge/discharge signal through the signal transmitting lines $X_0$ and $X_1$ and receiving the first voltage signal and the second voltage signal through the signal receiving lines $Y_0$ and $Y_1$ (or two sets of signal receiving lines), respectively. The first charge/discharge signal and the second charge/discharge signal are out of phase, e.g. in antiphase in this example, and may have the same charging level (FIG. 3B) or different charging levels (FIG. 10).

Figure 9:
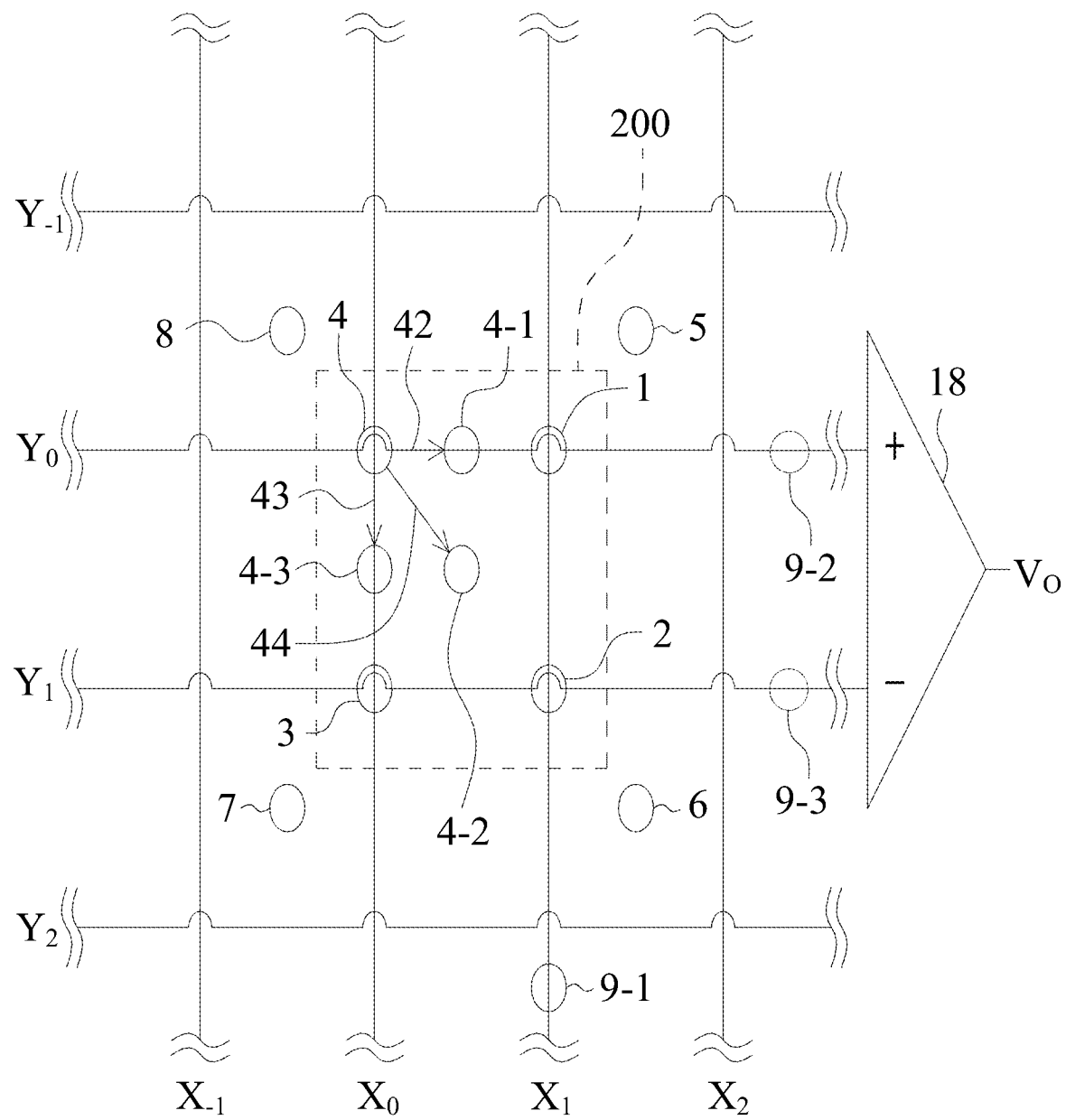
FIG. 9 is a schematic diagram illustrating the portion of the capacitive touch panel of FIG. 1 operated with another sensing method according to the present disclosure.

How a sensing method executing a single-stage charge/discharge operation according to the present disclosure works can be understood from the following derivation. When the scan window 200 moves to cover the crossover region defined by the signal lines $X_0$, $X_1$, $Y_0$, $Y_1$ as shown in FIG. 9, if a ridge of the fingerprint touches the position 1 on the signal transmitting line $Y_0$ and the signal receiving line $X_1$, the voltage y0 sensed at the signal receiving line $Y_0$ varies with the phase x1 of the signal on the signal transmitting line $X_1$. Alternatively, if a ridge of the fingerprint touches the position 2 on the signal transmitting line $Y_1$ and the signal receiving line $X_1$, the voltage y1 sensed at the signal receiving line $Y_1$ varies with the phase x1 of the signal on the signal transmitting line $X_1$; if a ridge of the fingerprint touches the position 3 on the signal transmitting line $X_0$ and the signal receiving line $Y_1$, the voltage y1 sensed at the signal receiving line $Y_1$ varies with the phase x0 of the signal on the signal transmitting line $X_0$; and if a ridge of the fingerprint touches the position 4 on the signal transmitting line $X_0$ and the signal receiving line $Y_0$, the voltage y0 sensed at the signal receiving line $Y_0$ varies with the phase x0 of the signal on the signal transmitting line $X_0$. Accordingly, if a ridge of the fingerprint touches the position 4-1 in the middle of the position 4 and the position 1, the voltage sensed at the signal receiving line $Y_0$ varies with both the phase x0 of the signal on the signal transmitting line $X_0$ and the phase x1 of the signal on the signal transmitting line $X_1$ with substantially equal effects; if a ridge of the fingerprint touches the position 4-2 in the middle of the position 4 and the position 2, each of the voltages y0 and y1 sensed at the signal receiving lines $Y_0$ and $Y_1$ varies with both the phase x0 of the signal on the signal transmitting line $X_0$ and the phase x1 of the signal on the signal transmitting line $X_1$ with substantially equal effects; if a ridge of the fingerprint touches the position 4-3 in the middle of the position 4 and the position 3, each of the voltages y0 and y1 sensed at the signal receiving lines $Y_0$ and $Y_1$ varies with the phase x0 of the signal on the signal transmitting line $X_0$. Table 1 summarizes the correspondence of the touch positions to the sensed voltages.

TABLE 1

| Touch position | Sensed voltage at signal receiving line |
|---|---|
| Position 4 | y0 → x0 |
| | y1 = 0 |
| Position 4-1 | y0 → AVG(x0, x1) |
| | y1 = 0 |
| Position 4-2 | y0 → AVG(x0, x1) |
| | y1 → AVG(x0, x1) |
| Position 4-3 | y0 → x0 |
| | y1 → x0 |

Furthermore, another eight neighboring scan window positions surrounding the scan window position as illustrated in FIG. 9, when scanned, also exhibit voltage change effects on the signal receiving lines, e.g. lines $Y_0$ and $Y_1$, to different extents for different proximity/contact points, e.g. the positions 4, 4-1, 4-2 and 4-3. Likewise, a plurality of characteristic values are generated by subtracting the voltage y1 sensed at the signal receiving line $Y_1$ from the voltage y0 sensed at the signal receiving line $Y_0$, and a characteristic value matrix A[p, q] is obtained. Once the characteristic value matrix A[p, q] is recorded, position information of one or more proximity/contact points on the capacitive touch panel can be estimated subsequently, wherein each proximity/contact point is a position which a ridge of the fingerprint touches on the capacitive touch panel. Table 2 exemplifies four 3×3 pattern matrices, in which data associated with the nine scan window positions are correspondingly allocated, and each element (2×2 matrix) corresponding to one scan window position consists of four characteristic values of the four touching positions 4, 4-1, 4-2 and 4-3, respectively.

TABLE 2

| 4 | 4-1 | | | | |
|---|---|---|---|---|---|
| 4-3 | 4-2 | | | | |
| 0 | −x0 | −x0 | −AVG(x0, x1) | −x1 | −x1 |
| 0 | −x0 | −x0 | −AVG(x0, x1) | −x1 | −x1 |
| 0 | x0 | x0 | AVG(x0, x1) | x1 | x1 |
| 0 | 0 | 0 | 0 | 0 | 0 |
| 0 | 0 | 0 | 0 | 0 | 0 |
| x0 | x0 | x0 | AVG(x0, x1) | x1 | x1 |

It is understood from the above table that characteristic values vary with scan window positions and touch positions relative to the reference position (e.g. intersection position of the signal transmitting line $X_0$ and the signal receiving line $Y_0$) in the scan windows 200. After the scan window 200 moves to scan over the capacitive touch panel, a characteristic value matrix A[p, q] can be obtained. For example, as shown in Table 2, the characteristic values (y0−y1) have seven kinds of expressions, i.e. x0, −x0, x1, −x1, AVG(x0,x1), −AVG(x0,x1) and 0. If the voltage x0 and the voltage x1 are numerically unequal, as exemplified in FIG. 10, the characteristic values in the characteristic value matrix A[p, q] may be differentiated with up to seven different values. If the voltage x0 is set to be 3V and the voltage x1 is set to be −3V, which are numerically equal as illustrated in FIG. 3B, the characteristic values (y0−y1) could be simplified to a positive number, a negative number and zero, similar to the 3×3 pattern matrices described in the previous embodiments. Therefore, an analysis can then be performed according to the 3×3 pattern matrices and the characteristic value matrix A[p, q].

Take the simplified case as an example, position information of one or more proximity/contact points on the capacitive touch panel can be estimated in Step 104 of FIG. 2B. The proximity/contact point is a position which a ridge of the fingerprint approaches or touches on the capacitive touch panel. For example, if there is no ridge of the fingerprint approaching or touching the capacitive touch panel, all of the characteristic values recorded into the characteristic value array A[p, q] as obtained in the scanning steps during a preset time period are 0. On the other hand, if a ridge of a fingerprint is approaching or touching an intersection of a signal transmitting line and a signal receiving line, e.g. $X_0$ and $Y_0$, of the capacitive touch panel, the characteristic value corresponding to the specified position and eight characteristic values corresponding to eight surrounding positions match a 3×3 predefined pattern matrix.

Therefore, by analyzing the characteristic value matrix A[p, q] based on 3×3 predefined pattern matrices, the position which a ridge approaches or contacts on the capacitive touch panel can be specified. For example, when the result of the operation meets a first pattern matrix consisting of all (1,1) entries in the nine 2×2 submatrices indicated by broader frames in TABLE 2, it is determined that the estimated proximity/contact point is $(X_0, Y_0)$ and an offset vector associated with the proximity/contact point is $(X_0, Y_0)$ is $\overline{0}$. That is, when the characteristic value matrix A[p, q] includes the (1,1)-entry pattern matrix, it is realized that there is a proximity/contact point at $(X_0, Y_0)$. If the characteristic value matrix A[p, q] includes more than one (1,1)-entry pattern matrix, it is realized that there exists another proximity/contact point at a specific intersection position of a signal transmitting line and a signal receiving line.

Likewise, when a part of the characteristic value matrix A[p, q] match other pattern matrices in TABLE 2, it is also estimated that there exists one proximity/contact point. The proximity/contact point is not at the intersection position but nearby the intersection $(X_0, Y_0)$ with a second offset vector 42, a third offset vector 43, or a fourth offset vector 44. For example, the 3×3 pattern matrix consisting of all (1,2) entries in the nine 2×2 submatrices in TABLE 2 indicates that the proximity/contact point is located on the right side of the intersection position $(X_0, Y_0)$ (for example, the position 4-1 shown in FIG. 9); the 3×3 pattern matrix consisting of all (2,2) entries in the nine 2×2 submatrices in TABLE 2 indicates that the proximity/contact point is located to the lower right of the intersection position $(X_0, Y_0)$ (for example, the position 4-2 shown in FIG. 9); and the 3×3 pattern matrix consisting of all (2,1) entries in the nine 2×2 submatrices in TABLE 2 indicates that a proximity/contact point is located below the intersection position $(X_0, Y_0)$ (for example, the position 4-3 shown in FIG. 9). Therefore, at the same routing density, the resolution can be increased to two times in both directions, and thus the overall resolution can be increased to four times.

Figure 11:
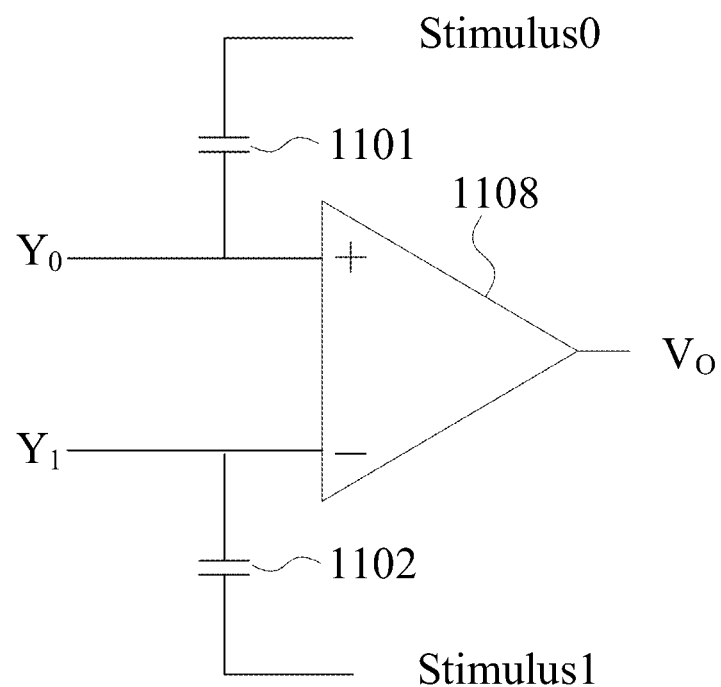
FIG. 11 is a schematic diagram illustrating a further embodiment of a comparator circuit of the biological feature-sensing device according to the present disclosure.

Please refer to FIG. 11, which illustrates an exemplified circuit of the comparator circuit 18 shown in FIG. 9. In this example, two voltage balance signals (a first stimulus signal Stimulus0 and a second stimulus signal Stimulus1) are received via respective input terminals where a first capacitor 1101 and a second capacitor 1102 are coupled to the comparator 1108 for voltage balance. Related disclosure has been described in US 2016/0188099 A1, and the contents of which are hereby incorporated herein by reference. The stimulus signals Stimulus0 and Stimulus1 may be provided by a signal source outside the comparator circuit 18 or even outside the control chip. Either by adjusting the voltage values of the first stimulus signal Stimulus0 and the second stimulus signal Stimulus1 or the capacitance values of the first capacitor 1101 and second capacitor 1102, the voltages at the two input terminals can be made equal to have the output voltage of the comparator 1108 be substantially zero. In this way, the characteristic value y0–y1 can be further simplified as a voltage difference Δ between the first stimulus signal and the second stimulus signal, e.g. Stimulus1–Stimulus0, a capacitance difference or a combination of voltage difference and capacitance difference.

TABLE 3 gives an example derived from TABLE 1, wherein the correspondence of the proximity/contact positions to the sensed voltages are expressed by voltage difference between the first stimulus signal Stimulus0 and the second stimulus signal Stimulus1.

TABLE 3

| Touch position | Voltage difference between stimulus signals |
| --- | --- |
| Position 4 | Δ = x0 |
| Position 4-1 | Δ = x0 + x1 |
| Position 4-2 | Δ = 0 |
| Position 4-3 | Δ = 0 |

The single-stage charge/discharge operation according to the present disclosure is particularly suitable for use in a capacitive touch panel that complies with the following conditions. Firstly, a capacitance value between a signal receiving line $Y_0$ and ground has to be large enough to make the effect resulting from the finger's touch on a point, e.g. the position 9-2, away from the scan window 200 negligible. In addition, a capacitance value between another signal receiving line $Y_1$ and ground has also to be large enough to make the effect resulting from the finger's touch on a point, e.g. the position 9-3, away from the scan window 200 negligible. This condition may be inherently satisfied in specific panels, or made satisfied by fine-tuning circuitry features of panels. Even if the condition is originally unsatisfied due to small linewidth or poor conductivity of the signal receiving line $Y_0$ or $Y_1$, the situation can still be remedied by combining a plurality of signal receiving lines as a group to conduct the sensing operation instead of the single signal receiving line. For example, the adjacent signal receiving lines $Y_{-1}$, $Y_0$ are electrically connected in parallel to function for the sensing operation instead of the single receiving line $Y_0$, and the adjacent signal receiving lines $Y_1$, $Y_2$ are electrically connected in parallel to function for the sensing operation instead of the single receiving line $Y_1$. In this way, the capacitance value of the signal receiving lines can be enlarged. Another condition is that a signal intensity sensed at a proximity/contact point in the scan window 200, e.g. the position 4, has to be much higher than a signal intensity sensed at a distant position, e.g. the position 9-2, thereby making the effect resulting from the finger's touch on the position 9-2 negligible. Likewise, a plurality of signal transmitting lines may be combined as a group, if necessary, to conduct the sensing operation instead of the single transmitting line. For example, the adjacent signal transmitting lines $X_{-1}$, $X_0$ are electrically connected in parallel to function for the sensing operation instead of the single transmitting line $X_0$, and the adjacent signal transmitting lines $X_1$, $X_2$ are electrically connected in parallel to function for the sensing operation instead of the single transmitting line $X_1$. In this way, the driving capability can be improved.

The number of the signal transmitting lines combined in one group may be different from the number of the signal receiving lines combined in one group. The line selection may be adjusted to meet real requirements. For example, three signal transmitting lines electrically connected in parallel and two signal receiving lines electrically connected in parallel are selected for the sensing operation. The selected lines in one group may be partially substituted by other line(s) while moving the scan window 200. In other words, the current scan window may partially overlap with the next scan window. For example, in the current scan window 200, the (N−1)th, Nth and (N+1)th signal transmitting lines electrically connected in parallel and the (N+2)th, (N+3)th and (N+4)th signal transmitting lines electrically connected in parallel are respectively driven. In the next scan window 200, the Nth, (N+1)th and (N+2)th signal transmitting lines electrically connected in parallel and the (N+3)th, (N+4)th and (N+5)th signal transmitting lines electrically connected in parallel are respectively driven. Thus, the scan window 200 is not a square, but may be adjusted to a rectangle with a specific aspect ratio.

Figure 12A:
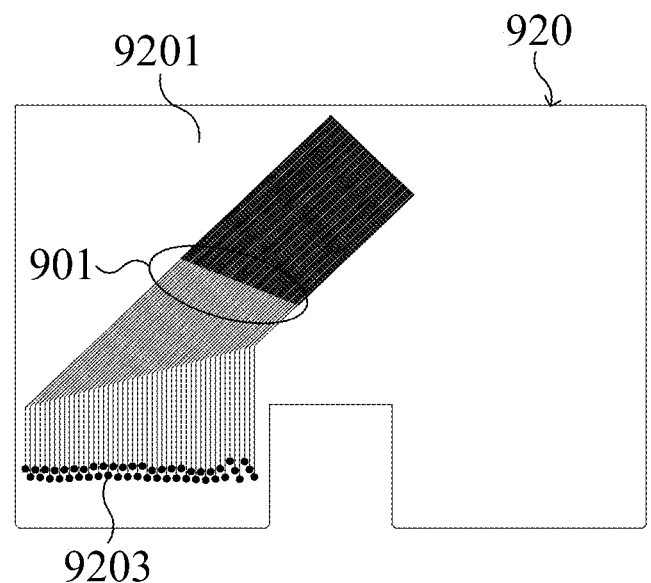
FIGS. 12A-12C are schematic diagrams illustrating a capacitive touch panel according to the present disclosure wherein the capacitive sensor array is applied to a flexible substrate.
Figure 12B:
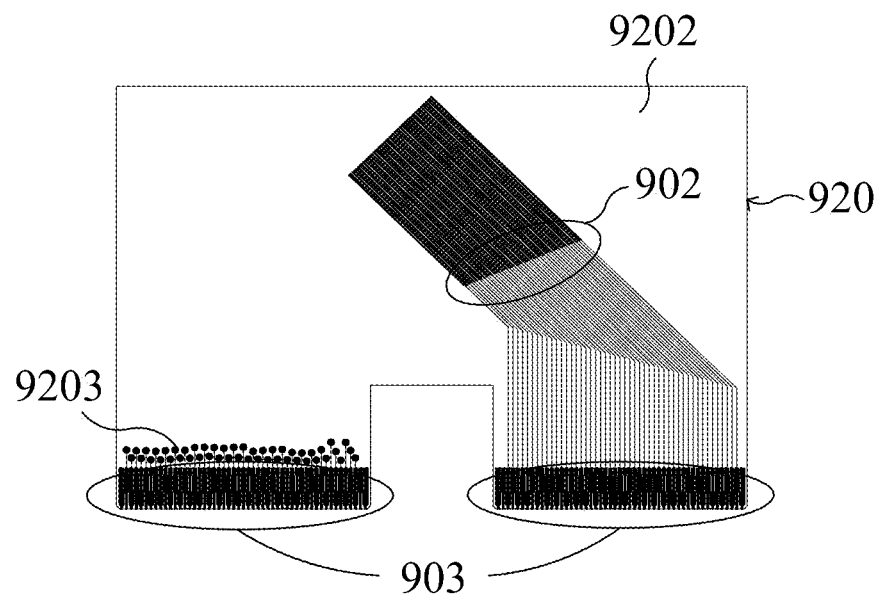
Figure 12C:
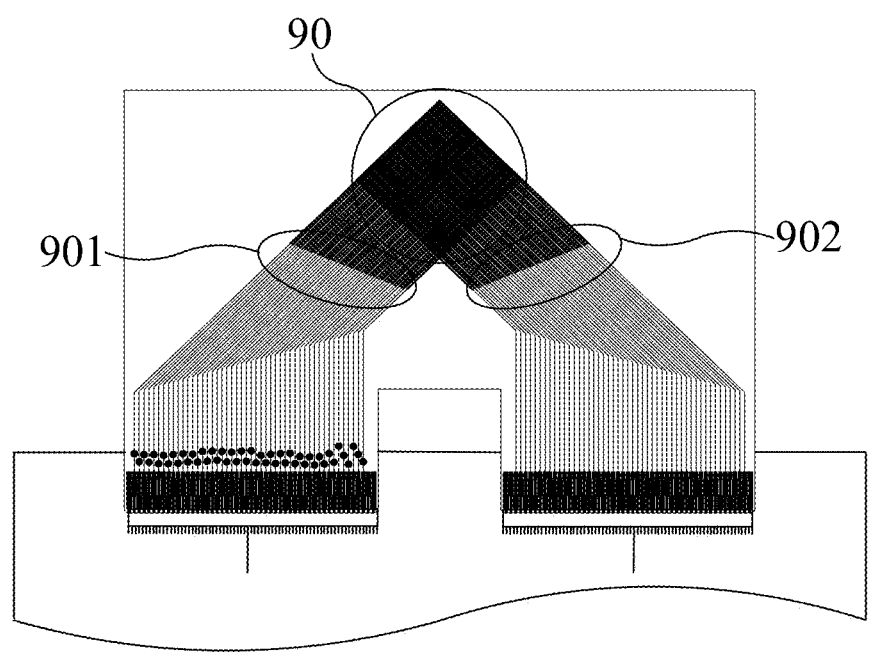

Please refer to FIGS. 12A-12C, which are schematic diagrams illustrating a capacitive touch panel according to the present disclosure wherein the capacitive sensor array 90 is applied to a flexible substrate. As shown in FIG. 12A, the first electrode group 901 is formed on a first surface 9201 of a flexible substrate 920. The flexible substrate 920 may be made of polyimide (PI). As shown in FIG. 12B, the second electrode group 902 is formed on a second surface 9202, opposite to the first surface 9201, of the flexible substrate 920. A plurality of signal pins 903 electrically connected to the first electrode group 901 and the second electrode group 902 are also provided on the second surface 9202 of the flexible substrate 920. A plurality of through holes 9203 penetrates through the flexible substrate 920 to conduct the first electrode group 901 on the first surface 9201 of the flexible substrate 920 to the signal pins 903 on the second surface 9202 of the flexible substrate 920. FIG. 12C is a top perspective view illustrating the capacitive sensor array 90 including the first electrode group 901, the second electrode group 902 and the flexible substrate 920. The crossover regions of the first electrode group 901 and the second electrode group 902 form the capacitive sensor array 90. In this embodiment, the capacitive sensor array 90 includes 48×48 sensing points at the crossover regions. In the capacitive sensor array 90, the pitch (centre-to-centre distance) of the first electrode group 901 and the second electrode group 902 is 6 mil, so as to provide a sensing area with 7.3 mm×7.3 mm (6 mil×48=7.3 mm). The sensing area is large enough to cover a characteristic region of a human fingerprint. Further, a capacitive sensor array 90 includes 100×100 sensing points (crossover regions) can provide a sensing area of 1.5 cm×1.5 cm. Such sensing area is sufficient to perform a full fingerprint scan with satisfied resolution. A fingerprint recognition module using the capacitive touch panel is much cheaper than the convention fingerprint recognition module. To keep high sensitivity, a protection cover (not shown) provided between the user's finger and the capacitive sensor array 90 should be as thin as possible, and so is the flexible substrate 920. According to the recent technical skill level, the protection cover may have a thickness ranging from 100 μm to 500 μm, and the flexible substrate 920 may have a thickness ranging from 20 μm to 100 μm. Another way for improving the sensitivity of the capacitive touch panel is to raise the signal operation voltage level.

In another embodiment, textile technology is applied to provide the capacitive touch panel 90 according to the disclosure. The first electrode group 901 and the second electrode group 902 are wires, made of conductive lines wrapped with insulating material. The wires serve as yarns and woven into a fabric together with normal yarns such as threads of cotton, wool, nylon, and etc. to form the capacitive sensor array 90. Neither the protection cover nor the flexible substrate described in the above embodiment is required. While touching the capacitive touch panel 90, the finger is closer to the signal lines because no protection cover is provided so as to increase the sensitivity. Related disclosure about integrating circuits into fabric product has been described in US 2017/0075481 A1, and the contents of which are hereby incorporated herein by reference.

Figure 13A:
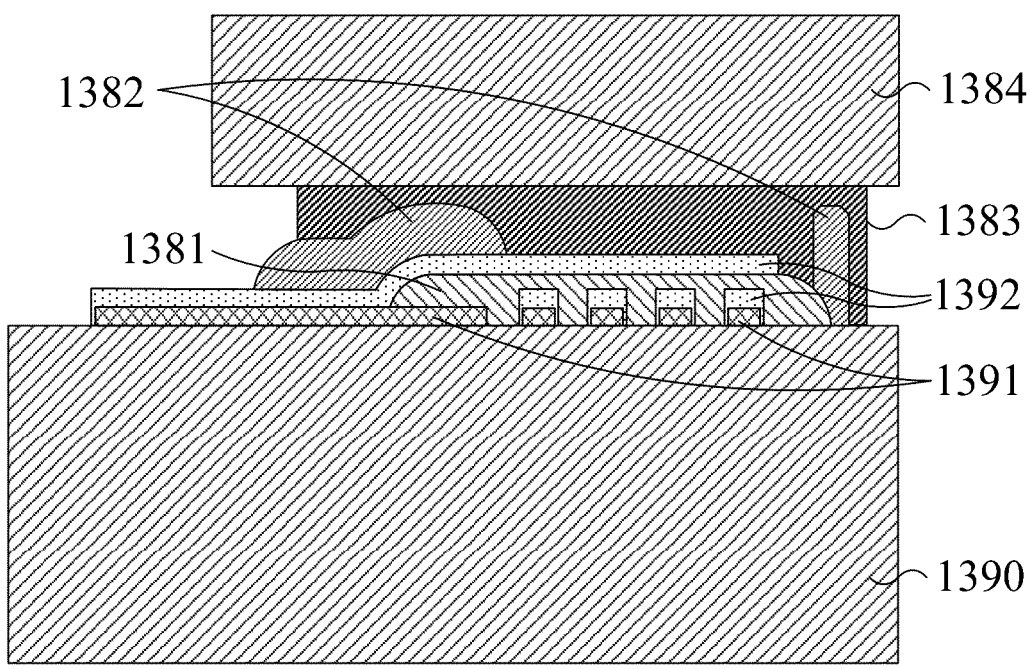
FIG. 13A is a cross-sectional view illustrating a capacitive touch panel according to the present disclosure wherein the capacitive sensor array is formed on a glass substrate.
Figure 13B:
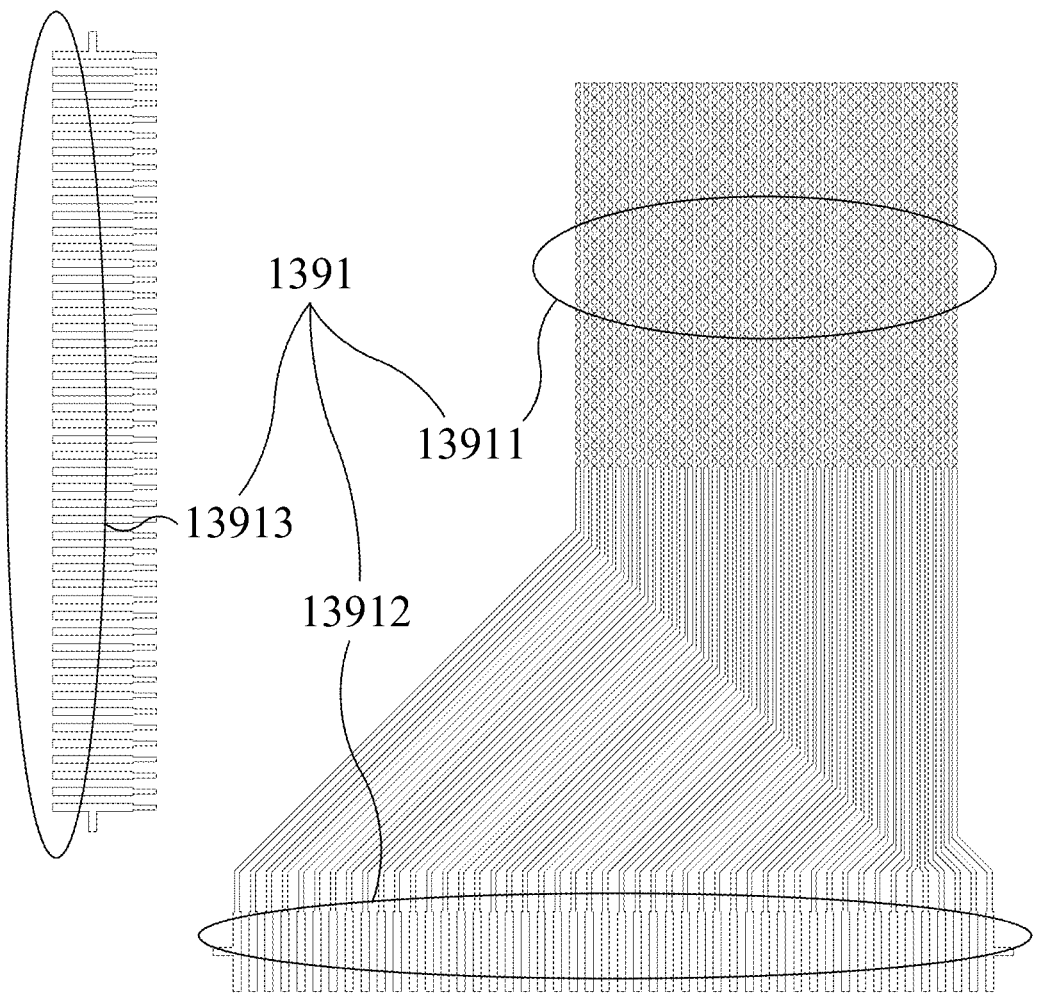
FIGS. 13B-13E are top views showing structure of each layer of the capacitive touch panel of FIG. 13A.
Figure 13C:
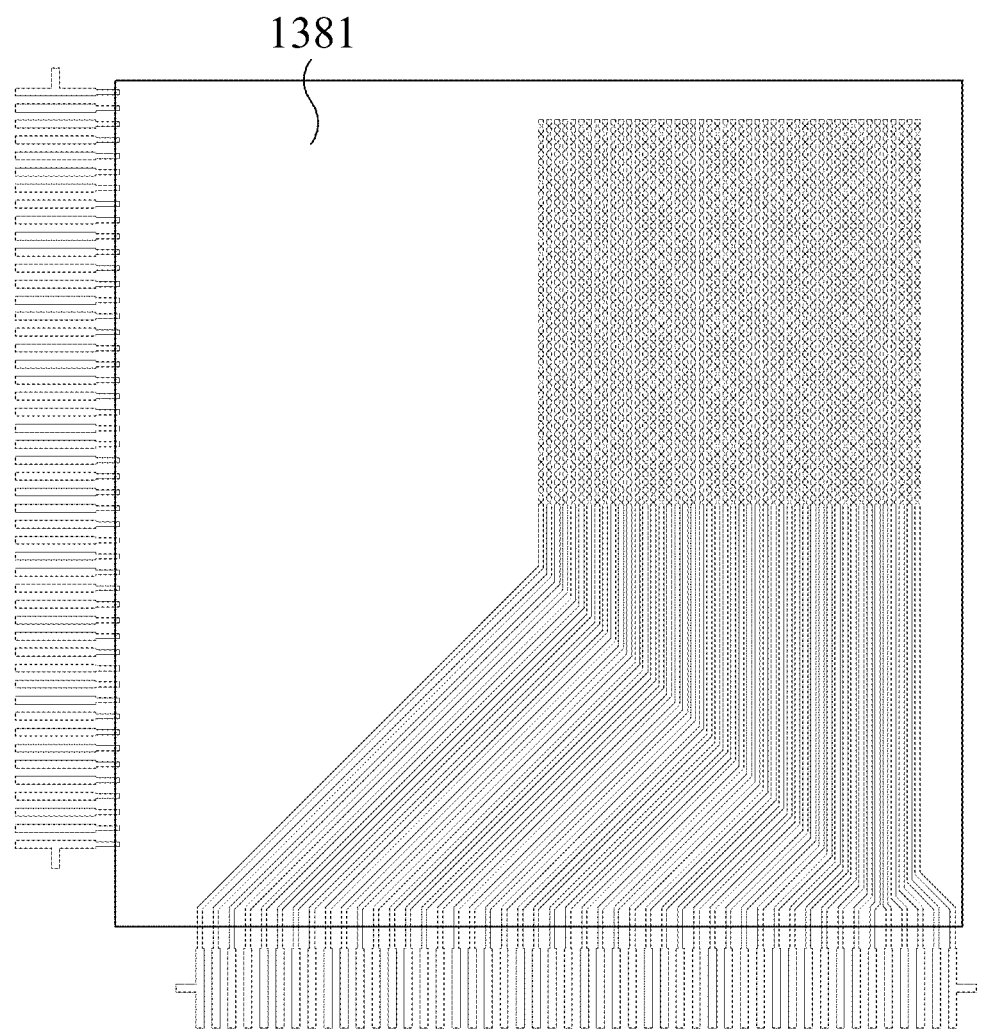
Figure 13D:
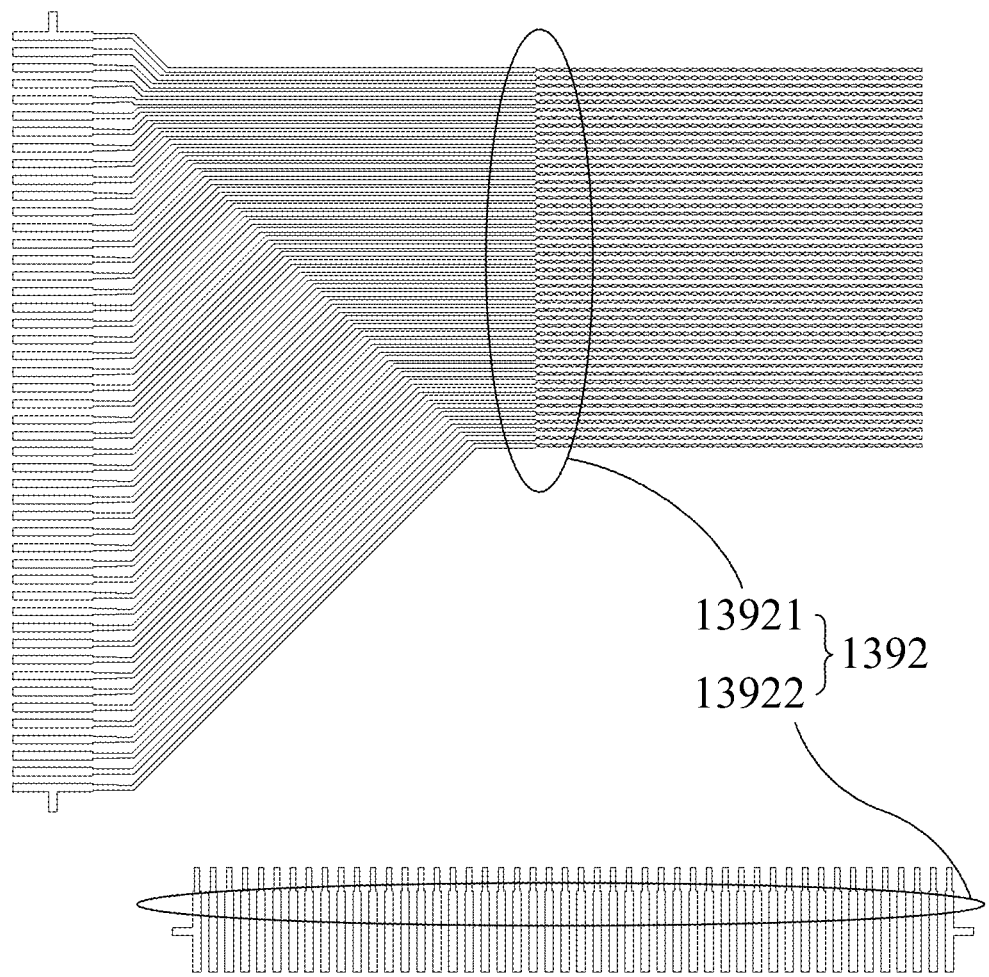
Figure 13E:
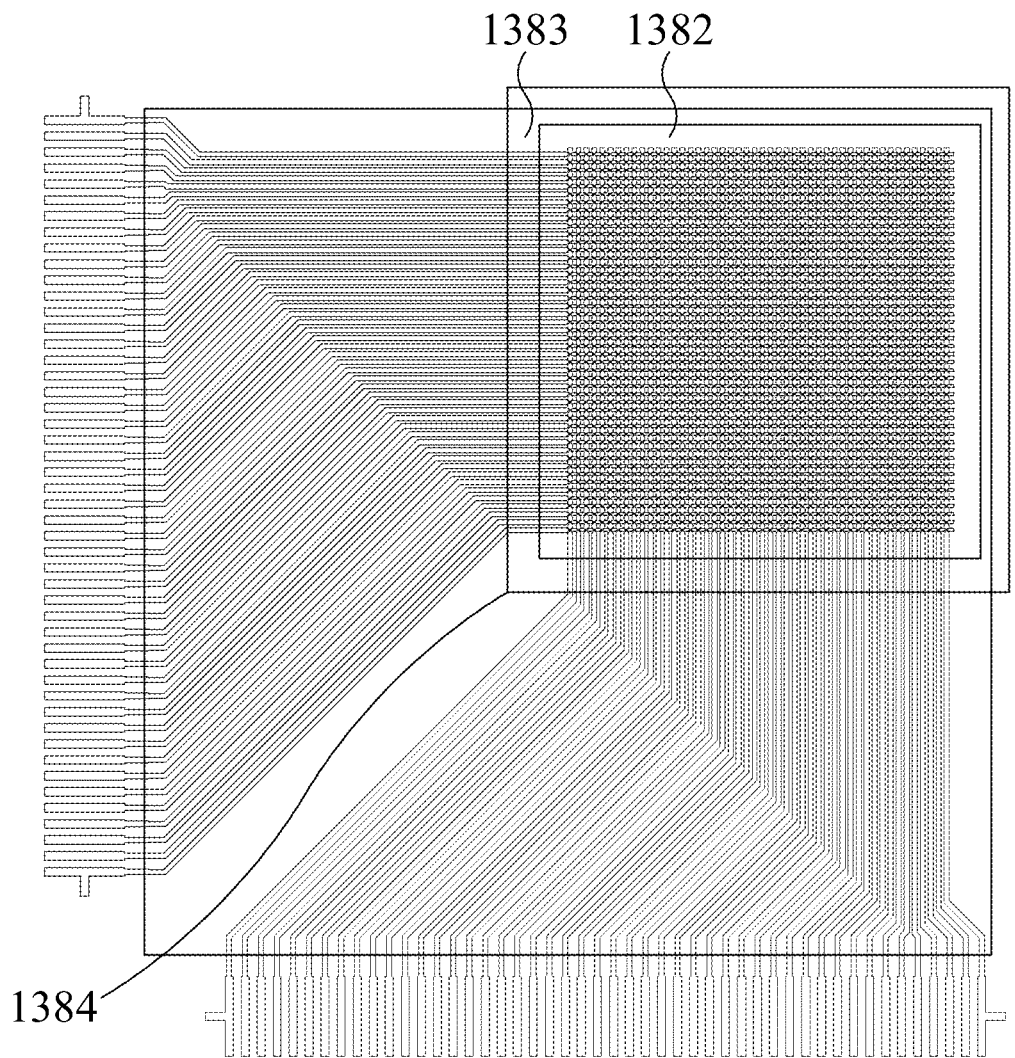

Please refer to FIG. 13A, which is a cross-sectional view illustrating a capacitive touch panel according to the present disclosure wherein the capacitive sensor array is formed on a glass substrate. A first conductive line structure 1391 with a thickness of about 30 nm is formed on a surface of a glass substrate 1390 with a thickness of about 1.1 mm. The top view of the first conductive line structure 1391 is shown in FIG. 13B. The first conductive line structure 1391 basically includes a first electrode group 13911 including 48 signal lines with a pitch of 200 μm, first set of signal pins 13912 and a second set of signal pins 13913 extending outwards. A first insulating layer 1381 with a thickness of 2 μm is formed on the first electrode group 13911, and the first set of signal pins 13912 and the second set of signal pins 13913 are exposed from the first insulating layer 1381, as shown in FIG. 13C. As shown in FIG. 13D, a second conductive line structure 1392 with a thickness of about 30 nm basically includes a second electrode group 13921 including 48 signal lines with a pitch of 200 μm and a set of enhanced pins 13922. The second electrode group 13921 is formed on the first insulating layer 1381 and extending outwards to be connected to the second set of signal pins 13913 to form electrical connection. In other to increase the conductivity, the set of enhance pins 13922 are surface-to-surface attached to the first set of signal pins 13912 exposed from the first insulating layer 1381 to have the largest contact area with the first set of signal pins 13912. As shown in FIG. 13E, a second insulating layer 1382 with a thickness of 2 μm is formed on the crossover region of the first electrode group 13911 and the second electrode group 13921. A glass cover 1384 is fixed to the second insulating layer 1382 and the second electrode group 1382 by an adhesive layer 1383 to cover the crossover region. The structure of the resultant capacitive touch panel is shown in FIG. 13A. In this embodiment, the glass substrate 1390 has a length and a width both of 25 mm, and the glass cover 1384 has a length and a width both of 12.7 mm. The finger-sensing region corresponding to the crossover region of the electrode groups has a length and a width both of about 12 mm and can entirely cover a normal human fingerprint.

Please refer to FIG. 14, which is a schematic diagram showing a human fingerprint image captured by the sensing method according to the present disclosure. The fingerprint image is obtained by transforming the characteristic value matrix into image type. There is an on-center spacing between any two adjacent ridges 1398 or any two adjacent valleys 1399. The minimum on-center spacing is about 100 μm. According to the present disclosure, at least one of the first pitch of the M signal transmitting lines and the second pitch of the N signal receiving lines is greater than or equal to the minimum on-center spacing. According to the present disclosure, the first pitch of the first electrode group 901 and/or the second pitch of the second electrode group 902 ranges from 150 μm to 200 μm. Compared with the conventional capacitive sensor array with a pitch of 50 μm, the linewidth of the two-dimensional sensor unit of the present disclosure can be designed to be greater than 50 μm to provide better electrical property.

Parallel ridges 1398 or parallel valleys 1399 are usually present in the fingerprint image. If the parallel ridges 1398 or the parallel valleys 1399 are parallel to the signal transmitting lines or the signal receiving lines, these ridges 1398 or valleys 1399 may not be correctly shown in the fingerprint image captured based on the dual-line sensing technology. Such phenomenon makes the following recognition difficult. Therefore, the user should be requested to change the finger direction relative to the capacitive touch panel for next sensing operation and recognition. The best sensing and recognition effect is observed when the parallel ridges 1398 or valleys 1399 extend along a diagonal line of the scan window, and this property can be utilized to decrease the rescan times. Changing the number of the signal lines electrically connected in parallel can effectively change the sensing signal intensity and the shape and size of the scan window. For example, referring to FIG. 9 again, the adjacent signal transmitting lines $X_0$ and $X_1$ are electrically connected in parallel to function as a single transmitting line, and the adjacent signal transmitting lines $X_2$ and $X_3$ are electrically connected in parallel to function as another single transmitting line. In this way, the signal intensity and the size of the scan window are changed, which is advantageous in sharpness of the fingerprint image.

On a condition that the number of the signal transmitting lines electrically connected in parallel is different from the number of the signal receiving lines electrically connected in parallel, the scan window becomes a rectangle. In this way, parallel ridges or valleys with a specific slope may be better distinguished by taking advantages of a rectangular scan window with a specific aspect ratio. If a portion of the fingerprint image captured with the square scan window is not clear, rectangular scan windows with different aspect ratios may be used to perform several sensing operation, and the obtained fingerprint images are combined to remove or discard fuzzy portions to provide a full and clear fingerprint image.

Figure 15A:
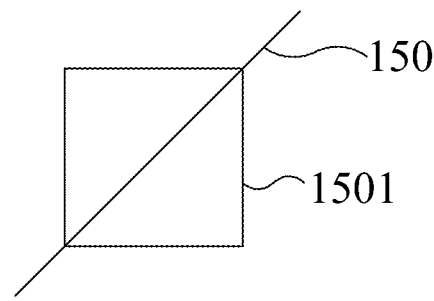
FIGS. 15A-15C are schematic diagrams exemplify scan windows used in the sensing method according to the present disclosure.
Figure 15B:
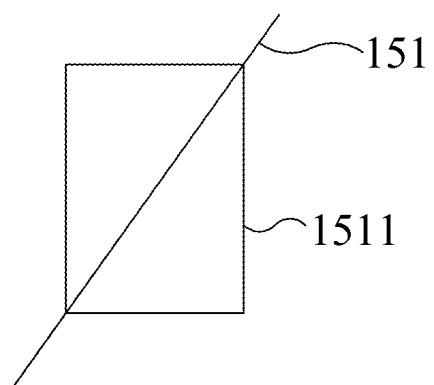
Figure 15C:
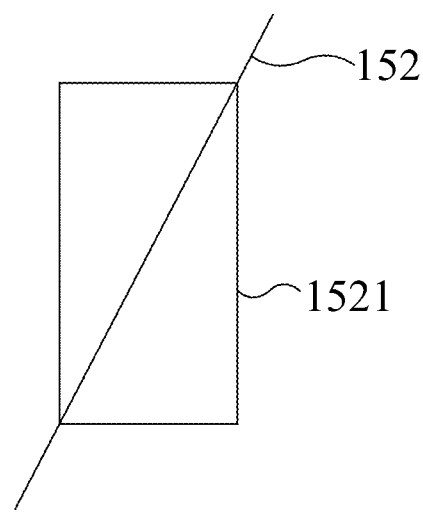

As shown in FIGS. 15A-15C, the rectangular scan windows 1501, 1511, 1521 have different aspect ratios. The scan windows 1501, 1511, 1521 can provide better scan effect when the parallel ridges or valleys extend along the diagonal lines 150, 151, 152, respectively. The scan windows 1501, 1511, 1521 are formed by combine different number of signal transmitting lines. Referring to FIG. 9, and taking the scan window 1501 as an example, the signal lines $X_0$, $X_1$, $Y_0$, $Y_1$ function as four signal lines for the sensing operation, and the scan window 1501 is substantially a square. Better sensing effect is shown for the ridges or valleys with a slope of about 45° relative to the horizontally allocated signal receiving lines. Referring to FIG. 9, and taking the scan window 1511 as an example, the signal lines $X_0$, $X_1$, combined $Y_{-1}$ with $Y_0$, combined $Y_1$ with $Y_2$ function as four signal lines for the sensing operation, and the scan window 1511 is a taller rectangle. Better sensing effect is shown for the ridges or valleys with a slope greater than 45°. After scanning the fingerprint with the scan windows with different aspect ratios and sizes during different time periods to get more fingerprint images, the better portions of each fingerprint image are picked and combined together to generate a clear fingerprint image for further recognition.

The aspect ratio of the scan window can be adjusted by selecting nonadjacent signal lines for sensing operation. For example, two adjacent signal transmitting lines $X_0$, $X_1$ are selected, and two nonadjacent signal receiving lines $Y_0$, $Y_2$ are selected. Thus, the scan window 1511 with an aspect ratio of 1:2 is obtained as shown in FIG. 15B. In another case, two adjacent signal transmitting lines $X_0$, $X_1$ are selected, and two nonadjacent signal receiving lines $Y_{-1}$, $Y_2$ are selected. Thus, the scan window 1521 with an aspect ratio of 1:3 is obtained as shown in FIG. 15C.

Thus, a first characteristic value matrix is obtained by sensing the human fingerprint with a scan window with a first aspect ratio, and than a second characteristic value matrix is obtained by sensing the human fingerprint with a scan window with a second aspect ratio. The two characteristic value matrices are compared (e.g. subtraction) to obtain a third characteristic value matrix. These characteristic value matrices may be recorded. While performing the fingerprint recognition, these characteristic value matrices may represent the characteristic of the target fingerprint, and needs not be transformed into a visual image composed of curves before the fingerprint recognition.

According to the present disclosure, the capacitive touch panel can be applied to a glass substrate or a flexible substrate as shown in FIG. 13A or FIG. 12C to provide a fingerprint sensor module. The two types of fingerprint sensor modules can be used for different applications. For example, a double-sided fingerprint sensor is formed by bonding two fingerprint sensor structures of the glass substrate-type together in a back-to-back manner. Alternatively, the two fingerprint sensor structures share a glass substrate which separates the capacitive sensor arrays of the two fingerprint sensor structures. The double-sided fingerprint sensor can be used in a mobile device. Once a user holds the mobile device (e.g. smart phone or smart card supporting authentication for mobile payment) between a thumb and a forefinger, fingerprint sensing operation for both the thumb and the forefinger may be performed at the same time. In another embodiment, two fingerprint sensor modules may be provided at two sides of a sensing region of a mobile device, e.g. left and right sides of a touch screen of a tablet computer or a smart phone supporting fingerprint authentication. Once the user holds the mobile device, fingerprint sensing operation for both the left thumb and the right thumb may be performed at the same time.

The present disclosure provides another sensing method. During a first time period, the control circuit transmits a first charge/discharge signal and a second charge/discharge signal through adjacent two sets of signal transmitting lines selected among the M signal transmitting lines, respectively. In this embodiment, each set of signal transmitting lines include two adjacent signal transmitting lines. The first charge/discharge signal and the second charge/discharge signal are out of phase. Then, the control circuit receives a first voltage signal and a second voltage signal through adjacent two sets of signal receiving lines selected among the N signal receiving lines, respectively, in response to the first charge/discharge signal and the second charge/discharge signal. The control circuit generates a first characteristic value corresponding to a neighboring region defined by the four sets of signal lines according to the first voltage and the second voltage signal. After repeating the three steps corresponding to different neighboring regions defined by different combinations of the signal lines, a plurality of first characteristic values are generated to form a first characteristic value matrix representing the biological feature information. During a second time period, the control circuit transmits a third charge/discharge and a four charge/discharge signal through adjacent two sets of signal transmitting lines selected among the M signal transmitting lines, respectively. Then, the control circuit receives a third voltage signal and a fourth voltage signal through adjacent two sets of signal receiving lines selected among the N signal receiving lines, respectively, in response to the third charge/discharge signal and the fourth charge/discharge signal. The control circuit generates a second characteristic value corresponding to the neighboring region defined by the four sets of signal lines according to the third voltage signal and the fourth voltage signal. After repeating the three steps corresponding to different neighboring regions defined by different combinations of the signal lines, a plurality of second characteristic values are generated to form a second characteristic value matrix representing the biological feature information. The two sets of signal receiving lines used during the first time period may be not identical to the two sets of signal receiving lines used during the second time period. For example, one set of signal receiving lines selected during the first time period or the second time period may be a set of auxiliary signal receiving lines. The set of auxiliary signal receiving lines will not form capacitive coupling with the object with the biological feature. An image value matrix representing the biological feature information is estimated according to the first characteristic value matrix and the second characteristic value matrix. In another case, the control circuit may set that each of the two sets of signal receiving lines used during the first time period includes a number A of signal receiving lines, and each of the two sets of signal receiving lines used during the second time period includes a number B of signal receiving lines. The number A is different form the number B. In a further case, the control circuit may set that the two sets of signal receiving lines used during the first time period include the same number of signal receiving lines and are adjacent to each other, and the two sets of signal receiving lines used during the second time period include the same number of signal receiving lines and are not adjacent to each other. According to the settings, the aspect ratio of the scan window covering the two sets of signal transmitting lines and the two sets of signal receiving lines used during the first time period is different from that used during the second time period. Therefore, different sensing operations are performed to obtain the first characteristic value matrix and the second characteristic value matrix, respectively, to estimate the image value matrix representing the biological feature information.

Figure 16:
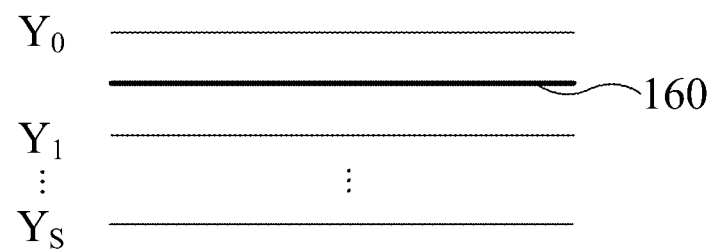
FIG. 16 is a schematic diagram illustrating the arrangement of the signal receiving lines and a auxiliary signal receiving line of the capacitive touch panel according to the present disclosure.

The dual-line sensing technology will cause a blind zone during sensing operation. The auxiliary signal receiving line is used for remedying such phenomenon. Please refer FIG. 16 for further description of the auxiliary signal receiving line. If a fingerprint characteristic 160 such a ridge or a valley is just positioned in the middle of the signal receiving lines $Y_0$ and $Y_1$, this fingerprint characteristic 160 can not be sensed. To solve this problem, a set of auxiliary signal receiving lines $Y_S$, serving as one set of signal receiving lines during the sensing operation, are further disposed on the substrate. The set of auxiliary signal receiving lines $Y_S$ will not form capacitive coupling with the object with the biological feature. For example, the set of auxiliary signal receiving lines $Y_S$ are disposed outside the touch area. The length and the material of the auxiliary signal receiving lines $Y_S$ are the same as those of the normal signal receiving lines. In this way, coupling imbalance is introduced between the two sets of signal receiving lines $Y_0$ and $Y_S$. One set of signal receiving lines $Y_0$ will form capacitive coupling with the object, but the other set of signal receiving lines $Y_S$ can not form capacitive coupling with the object. Hence, the fingerprint characteristic 160 just positioned in the middle of the signal receiving lines $Y_0$ and $Y_1$ can be properly sensed. Lastly, the image value matrix representing the biological feature can be estimated according to the first characteristic value matrix and the second characteristic value matrix, or the first characteristic value matrix and the second characteristic value matrix are directly recorded to represent the biological feature without transformation.

Figure 17A:
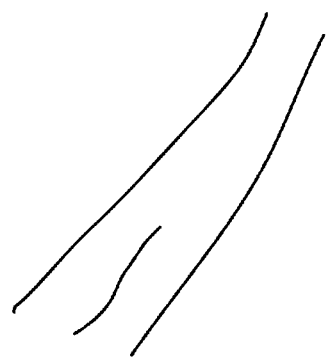
FIGS. 17A and 17B are schematic diagrams showing basic characteristics of a fingerprint.
Figure 17B:
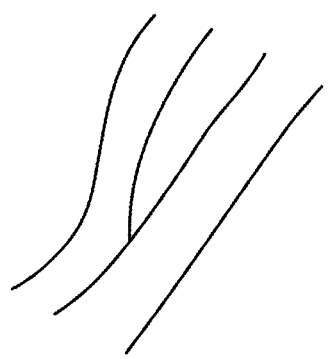

Please refer to FIGS. 17A and 17B, which are schematic diagrams showing basic characteristics of a fingerprint. The characteristics such as ridge ending (FIG. 17A), bifurcation (FIG. 17B), and short ridge will show specific data distribution in the characteristic value matrix. The ridge ending is the point at which a ridge terminates. The bifurcation is the point at which a single ridge splits into two ridges. The short ridge is significantly shorter than the average ridge length of the fingerprint. The fingerprint recognition is performed based on the specific data distribution corresponding to the fingerprint characteristics. Since the present disclosure provides a capacitive touch panel in large size for sensing the fingerprint with reduced cost, more fingerprint characteristics are present in the captured fingerprint image so as to increase the accuracy of the fingerprint recognition.

Figure 18:
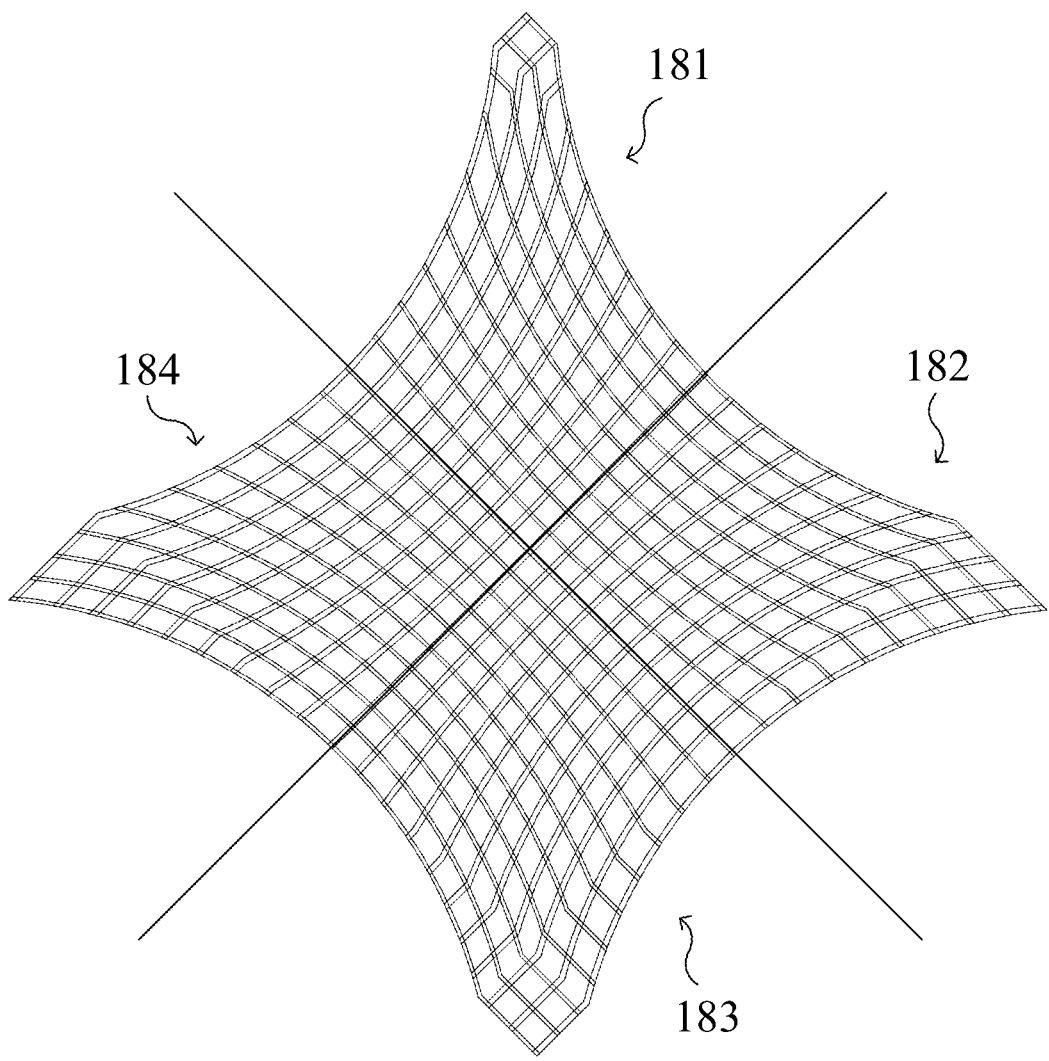
FIG. 18 is a schematic diagram illustrating the arrangement of the signal lines of a capacitive touch panel according to an embodiment of the present disclosure.

Please refer to FIG. 18, which is a schematic diagram illustrating the arrangement of the signal lines of a capacitive touch panel according to an embodiment of the present disclosure. The ridges and valleys of a fingerprint are not straight lines, but curves. From the above description, it is realized that the dual-line sensing technology has the best sensing effect when the ridges or valleys extend along a diagonal line of the scan window. It is also desired to decrease the possibility that the curves are just positioned in the middle position of the signal receiving lines. Therefore, the present disclosure arranges the signal lines in a specific manner. A plurality of curved signal transmitting lines and a plurality of curved signal receiving lines are provided in the capacitive touch panel. Preferably, convex ridges or valleys are sensed with concave signal receiving lines, and concave ridges or valleys are sensed with convex signal receiving lines. Concretely, at an intersection between a ridge and a signal receiving line, the center of curvature of the ridge and the center of curvature of the signal receiving line are at opposite sides of the curve of the ridge or the signal receiving line, so that the ridge and the signal receiving line bend or curve toward different or opposite directions. Therefore, it is almost impossible that the whole ridge is entirely located in the middle of two adjacent signal receiving lines. Furthermore, since the ridges to be sensed are substantially orthogonal to the signal lines (signal transmitting lines and signal receiving lines), better sensing effect is achieved. In the drawing, the capacitive touch panel is divided into four regions 181, 182, 183, 184, and in each of the regions 181, 182, 183, 184, there are at least one set of signal lines having different concave and convex property from the curved ridge touching this region. The number of the regions may be adjusted as desired.

Since the orientation of the finger touching on the capacitive touch panel will affect the sensing result, a pattern, a recess or a raised piece for guiding the user how to put the finger is provided. Otherwise, the orientation-dependent sensing can be utilized for fingerprint sensing and recognition. Concretely, when a user registers his fingerprint through the capacitive touch panel, the user is prompted via a user interface to put his thumb or forefinger on the capacitive touch panel at different directions, e.g. rotating the finger with an increased angle to 90°, 180°, 270° or 360° clockwise or counterclockwise. A plurality of characteristic value matrices corresponding to different angles of the finger during the rotation are recorded. For example, twelve characteristic value matrices, obtained by the sensing operation, corresponding to twelve angles among the rotation angles between 0° to 180° are sequentially recorded. When authorization process requires fingerprint input, the user can put his finger on the capacitive touch panel in any orientation to perform sensing operation. The obtained characteristic value matrix is respectively compared with the twelve recorded characteristic value matrices for identification. In another embodiment, a plurality of characteristic value sequences are recorded wherein each of the characteristic value sequence collects the characteristic values corresponding to a selected scan window during the rotation of the finger. In other words, the recordation focuses on the change resulting from the rotation of the finger. Thus, the authorization will require the user to rotate his finger during the sensing operation, and the sensed data are compared with the characteristic value sequences to identify whether the user touching the capacitive touch panel is a registered user. Furthermore, in an operation mode, the rotation direction of the finger on the capacitive touch panel may correspond to a specific function. For example, authorized clockwise rotation of the finger will lock the mobile device, and authorized counterclockwise rotation of the finger will unlock the mobile device.

Figure 19:
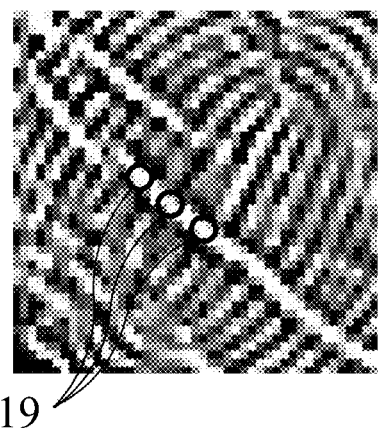
FIG. 19 is a schematic diagram showing a human fingerprint image having an unclear portion therein.

In another application, if an unclear or fuzzy portion is present in a fingerprint image as shown in FIG. 19, image processing algorithm may be performed on the unclear or fuzzy portion 19 to restore an image portion to generate a virtual fingerprint image. The image processing algorithm may involve average or linear interpolation for neighboring pixels of the unclear portion 19. The virtual fingerprint image is recorded for later authorization. Afterwards, when the user's fingerprint is sensed for authorization, the same image processing algorithm is performed on the specific portion of the captured fingerprint image to restore the fingerprint image, and the restored fingerprint image is compared with the recorded virtual fingerprint image to identify the user.

The capacitive touch panel developed based on the principle of the present disclosure is advantageous as it can still work when the pitch of the capacitive touch panel is greater than or equal to the on-center spacing of the biological feature so as to significantly reduce the product cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A biological feature-sensing device for acquiring biological feature information by sensing a biological feature having an uneven surface with a minimum on-center spacing between two adjacent relative extreme values, the biological feature-sensing device comprising:

a capacitive touch panel to be approached or touched with an object with the biological feature, the capacitive touch panel comprising M signal transmitting lines and N signal receiving lines, at least one of a first pitch of the M signal transmitting lines and a second pitch of the N signal receiving lines being greater than or equal to the minimum on-center spacing;

a control circuit electrically connected to the capacitive touch panel, the control circuit transmitting a first charge/discharge signal and a second charge/discharge signal through two sets of signal transmitting lines selected among the M signal transmitting lines, respectively, during a specified time period wherein the first charge/discharge signal and the second charge/discharge signal are out of phase, the control circuit receiving a first voltage signal and a second voltage signal through two sets of signal receiving lines selected among the N signal receiving lines, respectively, in response to the first charge/discharge signal and the second charge/discharge signal during the specified time period, the control circuit generating a characteristic value corresponding to a neighboring region defined by the two sets of signal transmitting lines and the two sets of signal receiving lines according to the first voltage signal and the second voltage signal, the control circuit repetitively performing the above three steps to generate a plurality of characteristic values corresponding to different neighboring regions defined by different combinations of the M signal transmitting lines and the N signal receiving lines, the plurality of characteristic values forming a characteristic value matrix representing the biological feature information.

2. The biological feature-sensing device according to claim 1, wherein the biological feature is a fingerprint, the object is a finger with the fingerprint, and the two adjacent relative extreme values are two adjacent ridges or two adjacent valleys, the first pitch and the second pitch ranging from 150 μm to 200 μm, a linewidth of the signal transmitting lines and the signal receiving lines being greater than 50 μm.

3. The biological feature-sensing device according to claim 2, wherein the capacitive touch panel comprises a capacitive sensor array to be approached or touched with the finger with fingerprint, the capacitive sensor array comprising a first electrode group and a second electrode group, the first electrode group comprising the M signal transmitting lines, the second electrode group comprising the N signal receiving lines.

4. The biological feature-sensing device according to claim 3, wherein the control circuit transmits the first charge/discharge signal and the second charge/discharge signal through two sets of first signal transmitting lines selected among the M signal transmitting lines, respectively, during a first time period wherein the first charge/discharge signal and the second charge/discharge signal are in anti-phase; receives the first voltage signal and the second voltage signal from two sets of first signal receiving lines selected among the N signal receiving lines, respectively, in response to the first charge/discharge signal and the second charge/discharge signal during the second time period; and generates a first characteristic value corresponding to the neighboring region defined by the two sets of first signal transmitting lines and the two sets of first signal receiving lines according to the first voltage signal and the second voltage signal, the control circuit repetitively performing the above three steps to generate a plurality of first characteristic values corresponding to different neighboring regions defined by different combinations of the M signal transmitting lines and the N signal receiving lines, the plurality of first characteristic values forming a first characteristic value matrix representing the fingerprint.

5. The biological feature-sensing device according to claim 4, wherein the control circuit transmits a third charge/discharge signal and a fourth charge/discharge signal through two sets of second signal transmitting lines selected among the M signal transmitting lines, respectively, during a second time period wherein the third charge/discharge signal and the fourth charge/discharge signal are in anti-phase; receives a third voltage signal and a fourth voltage signal through two sets of second signal receiving lines selected among the N signal receiving lines, respectively, in response to the third charge/discharge signal and the fourth charge/discharge signal during the second time period; and generates a second characteristic value corresponding to a neighboring region defined by the two sets of second signal transmitting lines and the two sets of second signal receiving lines according to the third voltage signal and the fourth voltage signal, the control circuit repetitively performing the above three steps to generate a plurality of second characteristic values corresponding to different neighboring regions defined by different combinations of the M signal transmitting lines and the N signal receiving lines, the plurality of second characteristic values forming a second characteristic value matrix representing the fingerprint, the two sets of first signal receiving lines being not identical to the two sets of second signal receiving lines, the control circuit estimating an image value matrix representing the fingerprint according to the first characteristic value matrix and the second characteristic value matrix.

6. The biological feature-sensing device according to claim 5, wherein one of the two sets of second signal receiving lines are one set of auxiliary receiving lines which do not form capacitive coupling with the object with the fingerprint.

7. The biological feature-sensing device according to claim 5, wherein each of the two sets of first signal receiving lines includes a number A of first signal receiving lines, and each of the two sets of second signal receiving lines includes a number B of second signal receiving lines, the number A being different from the number B.

8. The biological feature-sensing device according to claim 5, wherein the two sets of first signal receiving lines includes the same number of signal receiving lines and are adjacent to each other, and the two sets of second receiving lines includes the same number of signal receiving lines and are not adjacent to each other.

9. The biological feature-sensing device according to claim 3, wherein the capacitive sensor array is formed by textile technology, each of the first electrode group and the second electrode group comprising a plurality of conductive lines wrapped with insulating material, the first electrode group and the second electrode group being woven to form the capacitive sensor array.

10. The biological feature-sensing device according to claim 3, wherein the first electrode group and the second electrode group of the capacitive sensor array are formed on a first surface and a second surface of a flexible substrate, a protection cover being formed on the capacitive sensor array, the protection cover having a thickness ranging from 100 μm to 500 μm and the flexible substrate having a thickness ranging from 20 μm to 100 μm.

11. The biological feature-sensing device according to claim 3, wherein the capacitive sensor array is formed on a glass substrate, and the capacitive sensor array comprises:
 a first conductive line structure formed on a surface of the glass substrate and comprising the first electrode group, a first set of signal pins and a second set of signal pins;
 a first insulating layer formed on the first electrode group and exposing the first set of signal pins and the second set of signal pins;
 a second conductive line structure formed above the glass substrate and comprising the second electrode group and a set of enhanced signal pins, the second electrode group being formed on a surface of the first insulating layer and extending outwards to be connected to the second set of signal pins to form electrical connection, the set of enhanced signal pins being surface-to-surface attached to the first set of signal pins;
 a second insulating layer covering a crossover region of the first electrode group and the second electrode group; and
 a glass cover and an adhesive layer, the glass cover being fixed to the second insulating layer by the adhesive layer to cover the crossover region.

12. The biological feature-sensing device according to claim 3, wherein the control circuit transmits the first charge/discharge signal and the second charge/discharge signal through a first set of signal transmitting lines and a second set of signal transmitting lines selected among the M signal transmitting lines, respectively, during a first time period wherein the first charge/discharge signal and the second charge/discharge signal are out of phase; receives the first voltage signal and the second voltage signal through a first set of signal receiving lines and a second set of signal receiving lines selected among the N signal receiving lines, respectively, in response to the first charge/discharge signal and the second charge/discharge signal during the first time period; and generates a first characteristic value corresponding to the neighboring region defined by the first sets of signal transmitting lines, the second sets of signal transmitting lines, the first set of signal receiving lines and the second set of signal receiving lines according to the first voltage signal and the second voltage signal, the control circuit repetitively performing the above three steps to generate a plurality of first characteristic values corresponding to different neighboring regions defined by different combinations of the M signal transmitting lines and the N signal receiving lines, the plurality of first characteristic values forming a first characteristic value matrix representing the biological feature information, each of the first set of signal transmitting lines and the second set of signal transmitting lines including a number A of signal transmitting lines, each of the first set of signal receiving lines and the second set of signal receiving lines including a number B of signal receiving lines, wherein the number A is different from the number B.

13. The biological feature-sensing device according to claim 3, wherein the control circuit transmits the first charge/discharge signal and the second charge/discharge signal through a first set of signal transmitting lines and a second set of signal transmitting lines selected among the M signal transmitting lines, respectively, during a first time period wherein the first charge/discharge signal and the second charge/discharge signal are out of phase, receives the first voltage signal and the second voltage signal through a first set of signal receiving lines and a second set of signal receiving lines selected among the N signal receiving lines, respectively, in response to the first charge/discharge signal and the second charge/discharge signal during the first time period, and generates a first characteristic value corresponding to a neighboring region defined by the first sets of signal transmitting lines, the second sets of signal transmitting lines, the first set of signal receiving lines and the second set of signal receiving lines according to the first voltage signal and the second voltage signal, the control circuit repetitively performing the above three steps to generate a plurality of first characteristic values corresponding to different neighboring regions defined by different combinations of the M signal transmitting lines and the N signal receiving lines, the plurality of first characteristic values forming the first characteristic value matrix representing the biological feature information, the first set of signal transmitting lines and the second set of signal transmitting lines including the same number of signal transmitting lines and the first set of signal transmitting lines being adjacent to the second set of signal transmitting lines, the first set of signal receiving lines and the second set of signal receiving lines including the same number of signal receiving lines and the first set of signal receiving lines being nonadjacent to the second set of signal receiving lines.

14. The biological feature-sensing device according to claim 3, wherein at east one of the signal transmitting lines and the signal receiving lines in the first electrode group and the second electrode group is a curved signal line curving toward a different direction from a characteristic curve in the fingerprint to be sensed.

15. The biological feature-sensing device according to claim 1, wherein the control circuit transmits a third charge/discharge signal and a fourth charge/discharge signal through the two sets of signal transmitting lines selected among the M signal transmitting lines, respectively, during another specified time period wherein the third charge/discharge signal and the fourth charge/discharge signal are out of phase, the third charge/discharge signal and the first charge/discharge signal are in antiphase, and the fourth charge/discharge signal and the second charge/discharge signal are in antiphase; receives a third voltage signal and a fourth voltage signal through the two sets of signal receiving lines selected among the N signal receiving lines, respectively, in response to the third charge/discharge signal and the fourth charge/discharge signal during the another specified time period; and generates the characteristic value corresponding to the neighboring region defined by the two sets of signal transmitting lines and the two sets of signal receiving lines according to the first voltage signal, the second voltage signal, the third voltage signal and the fourth voltage signal, the control circuit repetitively performing the above three steps to generate the plurality of characteristic values corresponding to different neighboring regions defined by different combinations of the M signal transmitting lines and the N signal receiving lines, the plurality of characteristic values forming the characteristic value matrix representing the biological feature information.

16. A biological feature-sensing method used with a capacitive touch panel for acquiring biological feature information by sensing a biological feature having an uneven surface with a minimum on-center spacing between two adjacent relative extreme values, the biological feature-sensing device comprising M signal transmitting lines and N signal receiving lines, at least one of a first pitch of the M signal transmitting lines and a second pitch of the N signal receiving lines being greater than or equal to the minimum on-center spacing, the biological feature-sensing method comprising steps of:
   transmitting a first charge/discharge signal and a second charge/discharge signal through two sets of signal transmitting lines selected among the M signal transmitting lines, respectively, during a first time period wherein the first charge/discharge signal and the second charge/discharge signal are out of phase;
   receiving a first voltage signal and a second voltage signal through two sets of signal receiving lines selected among the N signal receiving lines, respectively, in response to the first charge/discharge signal and the second charge/discharge signal during the first time period;
   generating a first characteristic value corresponding to a neighboring region defined by the two sets of signal transmitting lines and the two sets of signal receiving lines according to the first voltage signal and the second voltage signal; and
   repetitively performing the above three steps to generate a plurality of first characteristic values corresponding to different neighboring regions defined by different combinations of the M signal transmitting lines and the N signal receiving lines, the plurality of first characteristic values forming a first characteristic value matrix representing the biological feature information.

17. The biological feature-sensing method according to claim 16, wherein one of the two sets of signal transmitting lines comprising a plurality of adjacent signal lines electrically connected in parallel.

18. The biological feature-sensing method according to claim 16, further comprising steps of:
   transmitting a third charge/discharge signal and a fourth charge/discharge signal through two sets of signal transmitting lines selected among the M signal transmitting lines, respectively, during a second time period wherein the third charge/discharge signal and the fourth charge/discharge signal are out of phase;
   receiving a third voltage signal and a fourth voltage signal through two sets of signal receiving lines selected among the N signal receiving lines, respectively, in response to the third charge/discharge signal and the fourth charge/discharge signal during the second time period;
   generating a second characteristic value corresponding to a neighboring region defined by the two sets of signal transmitting lines and the two sets of signal receiving lines according to the third voltage signal and the fourth voltage signal;
   repetitively performing the above three steps to generate a plurality of second characteristic values corresponding to different neighboring regions defined by different combinations of the M signal transmitting lines and the N signal receiving lines, the plurality of second characteristic values forming a second characteristic value matrix representing the biological feature information; and
   recording the first characteristic value matrix and the second characteristic value matrix, or recording a third characteristic value matrix representing the biological feature information according to both the first characteristic value matrix and the second characteristic value matrix.

19. The biological feature-sensing method according to claim 18, wherein a first scan window defined by the two sets of signal transmitting lines and the two sets of signal receiving lines during the first time period has a first aspect ratio, and a second scan window defined by the two sets of signal transmitting lines and the two sets of signal receiving lines during the second time period has a second aspect ratio different from the first aspect ratio, an image value matrix representing the biological feature information being estimated according to the first characteristic value matrix formed based on moving the first scan window and the second characteristic value matrix formed based on moving the second time scan window.

20. The biological feature-sensing method according to claim 18, wherein one of the two sets of signal receiving lines used during the first time period or the second time period are one set of auxiliary receiving lines which do not form capacitive coupling with the object with the biological feature.

21. The biological feature-sensing method according to claim 16, wherein the biological feature is a fingerprint of a finger and the biological feature-sensing method further comprises steps of:
   sensing the fingerprint during clockwise rotation or counterclockwise rotation of the finger; and
   recording a plurality of characteristic value matrices at different rotation angles of the finger.

22. The biological feature-sensing method according to claim 21, wherein a plurality of sequences are recorded to represent the biological feature information, each of the plurality of sequences being corresponding to a position in the plurality of characteristic value matrices and recording changes of the characteristic values during the clockwise rotation or counterclockwise rotation of the finger.

23. The biological feature-sensing method according to claim 16, further comprising steps of:
   estimating a fingerprint image according to the first characteristic value matrix;
   performing an image processing algorithm on a fuzzy portion of the fingerprint image to obtain a virtual fingerprint image; and
   recording the virtual fingerprint image.

24. The biological feature-sensing method according to claim 23, further comprising steps of:
   performing the image processing algorithm on a specified portion of a fingerprint image captured for authorization to obtain a restored fingerprint image; and
   comparing the restored fingerprint image with the recorded virtual fingerprint image.

* * * * *